(12) United States Patent
Kim

(10) Patent No.: US 12,435,824 B2
(45) Date of Patent: *Oct. 7, 2025

(54) COUPLER AND CLEAN CONNECTION DEVICE HAVING THE SAME

(71) Applicant: HOSAN TECH CO., LTD., Anseong-si (KR)

(72) Inventor: Chul Won Kim, Seoul (KR)

(73) Assignee: HOSAN TECH CO., LTD., Anseong-si (KR)

( * ) Notice: Subject to any disclaimer, the term of this patent is extended or adjusted under 35 U.S.C. 154(b) by 321 days.

This patent is subject to a terminal disclaimer.

(21) Appl. No.: 17/988,429

(22) Filed: Nov. 16, 2022

(65) Prior Publication Data

US 2023/0175632 A1    Jun. 8, 2023

(30) Foreign Application Priority Data

Dec. 3, 2021  (KR) .......................... 10-2021-0171439

(51) Int. Cl.
  *F16L 37/35*  (2006.01)
  *F16L 58/18*  (2006.01)

(52) U.S. Cl.
  CPC ............ *F16L 37/35* (2013.01); *F16L 58/185* (2013.01); *F16L 2201/20* (2013.01); *Y10T 137/4245* (2015.04); *Y10T 137/87957* (2015.04)

(58) Field of Classification Search
  CPC . F16L 37/32; F16L 37/35; F16L 37/36; F16L 37/50; F16L 37/505; F16L 58/185; F16L 23/003; F16L 2201/20; F16L 2201/40; F16L 2201/44; B67D 7/0294; B67D 7/3209; B67D 7/78; B67D 2210/00057; H01L 21/67017; Y10T 29/5367; Y10T 137/4245; Y10T 137/4259; Y10T 137/4266; Y10T 137/87925; Y10T 137/87933; Y10T 137/87957
  USPC ..... 29/237; 137/238, 240, 241, 614, 614.01, 137/614.04; 251/149, 149.1
  See application file for complete search history.

(56) References Cited

U.S. PATENT DOCUMENTS

| | | | | |
|---|---|---|---|---|
| 1,009,570 | A | * | 11/1911 | Pulliam et al. .......... F16L 37/32 137/614.04 |
| 1,987,235 | A | * | 1/1935 | Janeway, Jr. ........... F16L 21/04 138/DIG. 6 |
| 2,904,351 | A | * | 9/1959 | Gellett .................. F16K 35/025 137/630.14 |
| 2,905,486 | A | * | 9/1959 | Goodin, Jr. ............ F16L 37/34 285/277 |

(Continued)

FOREIGN PATENT DOCUMENTS

| KR | 20080081903 A | 9/2008 |
|---|---|---|
| KR | 20100008359 U | 8/2010 |

(Continued)

*Primary Examiner* — Kenneth Rinehart
*Assistant Examiner* — Jonathan J Waddy
(74) *Attorney, Agent, or Firm* — NKL Law; Jae Youn Kim

(57) ABSTRACT

Herein is a coupler and a clean connection device having the same, which can automate a series of operations for connecting and disconnecting a male coupler to and from a female coupler, clean and dry a wetted portion, drain residual liquid of chemicals together with cleaning water without external leakage in safety when the coupler is separated, and clean and dry the wetted surface before connection and after separation, thereby enabling a clean connection.

9 Claims, 23 Drawing Sheets

(56) References Cited

U.S. PATENT DOCUMENTS

| | | | | | |
|---|---|---|---|---|---|
| 2,957,504 | A | * | 10/1960 | Botkin | F16L 37/248 137/322 |
| 5,343,891 | A | * | 9/1994 | Bosley | E21B 33/0355 137/614.04 |
| 5,649,563 | A | * | 7/1997 | Shimano | F16K 1/446 137/240 |
| 6,719,270 | B2 | * | 4/2004 | Ozawa | F16L 41/16 285/308 |
| 9,121,512 | B2 | * | 9/2015 | Ranpuria | F16K 1/226 |
| 12,090,528 | B2 | * | 9/2024 | Kim | B08B 5/00 |
| 2009/0267346 | A1 | * | 10/2009 | Hasunuma | F16L 37/35 285/316 |
| 2009/0272450 | A1 | * | 11/2009 | Hasunuma | F16L 37/62 138/89 |
| 2010/0001517 | A1 | * | 1/2010 | Hasunuma | F16L 37/40 285/315 |
| 2017/0059076 | A1 | * | 3/2017 | Hasunuma | F16K 17/04 |
| 2019/0285207 | A1 | * | 9/2019 | Hayashi | F16L 39/04 |
| 2020/0018434 | A1 | * | 1/2020 | Hasunuma | F16L 37/08 |
| 2020/0032915 | A1 | * | 1/2020 | Imai | F16L 37/32 |
| 2020/0032947 | A1 | * | 1/2020 | Hasunuma | F16L 21/03 |
| 2020/0158275 | A1 | * | 5/2020 | Whitney, Jr. | F16L 37/0925 |
| 2022/0307635 | A1 | * | 9/2022 | Kim | B08B 13/00 |
| 2022/0341529 | A1 | * | 10/2022 | Kim | F16L 37/23 |

FOREIGN PATENT DOCUMENTS

| | | | |
|---|---|---|---|
| KR | 20110082670 | A | 7/2011 |
| KR | 10-2020-0025017 | A | 3/2020 |
| KR | 20200122907 | A * | 10/2020 |
| KR | 102295510 | B1 | 8/2021 |

\* cited by examiner

COUPLER AND CLEAN CONNECTION DEVICE HAVING THE SAME

BACKGROUND OF THE INVENTION

Field of the Invention

The present invention relates to a clean connection device, and more specifically, to a coupler and a clean connection device having the coupler, which can drain residual liquid generated without external leakage when a male coupler and a female coupler are connected or disconnected, and clean and dry a wetted surface.

Background Art

In general, in a semiconductor fabrication plant or the like, various kinds of chemicals are loaded and transported in a tank lorry and unloaded to a storage tank of the plant, and a quick coupler is used for such loading and unloading operations.

The quick coupler is composed of a male coupler and a female coupler, and connects or disconnects tubular members, such as a hose or a pipe without a separate assembly tool. Inside flow paths of the tubular members are connected or disconnected through connection or disconnection between the male coupler and the female coupler.

In particular, since chemicals used in a semiconductor fabrication plant have many acidic or alkaline toxic substances and may be fatal to the human body when a safety accident occurs, it is important to remove the chemicals or contaminants stained on a wetted portion when the coupler is connected and disconnected to keep a worker in safety after the connection or disconnection of the coupler.

Referring to FIG. 1, a conventional quick coupler is configured such that a female coupler 700 and a male coupler 800 can be connected and disconnected. The female coupler 700 includes a female coupler body 707, a sleeve 705, a plurality of balls 704, and a female check plunger 702. The male coupler 800 includes a male coupler body 808, and a male check plunger 805. The plurality of balls 704 are restraining means for changing a restrained state between the couplers according to the forward and backward movement of the sleeve 705, and a coupling groove 803 coupled with the ball 704 is recessed on the outer circumferential surface of the male coupler 800.

The sleeve 705 is provided on the outer side of the female coupler body 707 to be slidable in a predetermined range in an axial direction. A first elastic member 703 is provided between the sleeve 705 and the female coupler body 707. The first elastic member 703 may be a compression spring to provide an elastic force to move the sleeve 705 axially with respect to the female coupler body 707. In this case, the forward direction of the sleeve is the right direction of FIG. 1. Although not shown, a stopper for preventing separation of the sleeve 705 is provided on the female coupler body 707.

The female check plunger 702 is slidably provided within a predetermined range in the axial direction inside the female coupler body 707. A second elastic member 701 is provided between the female check plunger 702 and the female coupler body 707. The second elastic member 701 may be a compression spring to provide an elastic force to move the female check plunger 702 axially with respect to the female coupler body 707. In this case, the forward direction of the female check plunger is in the right direction of FIG. 1. A support 706 for supporting one side of the second elastic member 701 is coupled to the inside of the female coupler body 707.

In addition, a communication hole 708 is formed in the female check plunger 702. In a state in which the female check plunger 702 is maximally advanced, an internal flow path of the female coupler body 707 is closed by a female check plunger 702. When the female check plunger 702 moves backward, the internal flow path of the female coupler body 707 is opened through the communication hole 708. An O-ring 709 is provided between the female check plunger 702 and the female coupler body 707. In addition, another O-ring 711 for sealing between the female coupler 700 and the male coupler 800 is provided on the inner circumferential surface of the female coupler body 707.

The male check plunger 805 is slidably provided within a predetermined range in the axial direction inside the male coupler body 808. A third elastic member 802 is provided between the male check plunger 805 and the male coupler body 808. The third elastic member 802 may be a compression spring to provide an elastic force to move the male check plunger 805 axially with respect to the male coupler body 808. In this case, the forward direction of the male check plunger is the left direction of FIG. 1. A support 809 for supporting one side of the third elastic member 802 is coupled to the inside of the male coupler body 808.

Moreover, a communication hole 807 is formed in the male check plunger 805. In a state in which the male check plunger 805 maximally moves forward, the internal flow path of the male coupler body 808 is closed by the male check plunger 805. When the male check plunger 805 moves backward, the internal flow path of the male coupler body 808 is opened through the communication hole 807. An O-ring 806 is provided between the male check plunger 805 and the male coupler body 808. In a state where the male coupler 800 and the female coupler 700 are completely inserted, an end portion 801 of the male coupler body comes into close contact with a support portion 516 of the female coupler body, an end portion 713 of the female coupler body comes into close contact with a support portion 804 of the male coupler body, and the female check plunger 702 and the male check plunger 805 push each other to communicate the internal flow paths.

A connection process of the conventional quick coupler will now be described. Referring to FIG. 2A, the sleeve 705 of the female coupler 700 is first retracted back so that the ball 704 can move freely. Referring to FIG. 2B, the male coupler 800 is inserted into the female coupler 700 in the state of FIG. 2A. From the position of FIG. 2B, the female check plunger 702 and the male check plunger 805 push each other to communicate the flow paths with each other.

Thereafter, as illustrated in FIG. 3A, the male coupler 800 is completely inserted into the female coupler 700 such that the end portion 801 of the male coupler body is in close contact with a support portion 710 of the female coupler body. Referring to FIG. 3B, when the sleeve 705 of the female coupler 700 moves forward, the ball 704 is coupled to the coupling groove 803 of the male coupler 800. The balls 704 restrain a gap between the female coupler 700 and the male coupler 800 to prevent the male coupler 800 from being separated from the female coupler 700 in the axial direction and maintain the coupled state.

Next, a separation process of the conventional quick coupler is described. Referring to FIG. 4A, the sleeve 705 of the female coupler 700 is first retracted back so that the ball 704 can move freely. Referring to FIG. 4B, the male coupler 800 is separated from the female coupler 700 in the state of FIG. 4A. In this instance, the female check plunger 702 and the male check plunger 805 which push each other are separated from each other so that the flow path is closed.

Residual emission liquid 780 of the chemicals is generated before the flow path is completely closed in the process of FIG. 4B. Referring to FIG. 5A, the sleeve 705 of the female coupler 700 moves forward to terminate the separation. Referring to FIG. 5B, the reference numeral 790 represented by a bold line is a wetted surface of the chemicals, namely, a surface with which chemical liquid comes into contact when the flow path is opened. Before and after transferring the chemical liquid without contaminants and separating the coupler, it is necessary to clean and dry the wetted surface 790 for safety of the worker.

SUMMARY OF THE INVENTION

Accordingly, the present invention has been made to solve the above-mentioned problems occurring in the prior arts, and it is an object of the present invention to provide a coupler and a clean connection device having the same, which can automate a series of operations for connecting and disconnecting a male coupler to and from a female coupler, clean and dry a wetted portion, drain residual liquid of chemicals together with cleaning water without external leakage in safety when the coupler is separated, and clean and dry the wetted surface before connection and after separation, thereby enabling a clean connection.

To accomplish the above object, according to the present invention, there is provided a coupler mounted in a clean connection device including a clean female coupler and a male coupler to load and unload chemicals from one tank to another tank, wherein the male coupler includes a male check plunger for opening and closing a flow path while sliding in a male coupler body, and the clean female coupler includes a female check plunger for opening and closing a flow path while sliding in a clean female coupler body, wherein a coupler cleaning module is disposed to clean and dry wetted surfaces of the male coupler and the clean female coupler, and wherein the clean female coupler body has a first O-ring disposed on the clean female coupler body to prevent residual liquid of the chemicals, which is generated while the male coupler and the clean female coupler are separated from each other in a state in which the male coupler is inserted into the clean female coupler, from leaking to the outside.

The coupler cleaning module injects cleaning fluid or drying fluid into an inner space of the female coupler body in a state in which the male coupler is inserted into the clean female coupler body and before the male check plunger and the female check plunger come into contact with each other.

Moreover, the clean female coupler body is formed in a cylindrical shape and comprises an injection port and a discharge port formed in the outer circumferential surface thereof, the injection port is formed to supply the cleaning fluid or the drying fluid to the inner space of the clean female coupler body, and the discharge port is formed to drain the cleaning fluid or the drying fluid from the inner space of the clean female coupler body. Therefore, the wetted surfaces of the male coupler and the clean female coupler are cleaned and dried when the fluid introduced through the injection port is drained to the discharge port.

The clean female coupler body includes a second O-ring for preventing the chemicals from leaking to the outside in a state in which the male coupler is completely inserted into the clean female coupler body to open the flow paths of the male coupler and the clean female coupler.

A circular ring-shaped reinforcing plate is provided on a cross section of the clean female coupler body facing the male coupler, and a groove is formed along the circumference between the clean female coupler and the reinforcing plate. The first O-ring is inserted into the groove to be mounted between the clean female coupler body and the reinforcing plate.

The clean female coupler body and the reinforcing plate are made of different materials.

The clean female coupler body further includes a third O-ring spaced apart from the second O-ring in the insertion direction of the male coupler and the clean female coupler to doubly prevent the leak of the chemicals.

The injection port and the discharge port are formed to be spaced apart from each other in the insertion direction of the male coupler and the clean female coupler.

In another aspect of the present invention, there is provided a clean connection device including a clean female coupler and a male coupler to load and unload chemicals from one tank to another tank, wherein the male coupler comprises a male check plunger for opening and closing a flow path while sliding in a male coupler body, and the clean female coupler comprises a female check plunger for opening and closing a flow path while sliding in a clean female coupler body, wherein a coupler cleaning module is disposed to clean and dry wetted surfaces of the male coupler and the clean female coupler, and wherein the clean female coupler body has a first O-ring disposed on the clean female coupler body to prevent residual liquid of the chemicals, which is generated while the male coupler and the clean female coupler are separated from each other in a state in which the male coupler is inserted into the clean female coupler, from leaking to the outside.

The clean connection device includes: a main body having a clean female coupler; and a coupler connection module for moving the male coupler connected to the one tank in a Y-axis direction so as to connect or disconnect the male coupler to or from the clean female coupler.

The clean connection device further includes an alignment module for moving the male coupler in an X-axis direction to align the clean female coupler in position, wherein the alignment module includes: a base plate; a pinion rotatably connected to the base plate; a pinion driving part rotating the pinion; a pair of clamp guide rails extending in parallel in the X-axis direction in a state in which the pinion is interposed between the clamp guide rails; a clamp slider guided by the clamp guide rails and having a rack coupled to the pinion; and an alignment clamp coupled to the clamp slider to align the male coupler by moving in the X-axis direction.

The coupler connection module includes a grip part for gripping and fixing a flange of the male coupler, and a driving part for moving the grip part in the Y-axis direction. The grip part includes: a grip case having a hole through which the flange of the male coupler passes; at least a pair of grippers assembled to the grip case to bite the flange of the male coupler; a pair of X-axis moving blocks to which the grippers are fixed and which face each other in the X-axis direction; a guide groove diagonally formed on an upper end of the X-axis moving block; a lifting block inserted into the pair of guide grooves to be vertically guided; a lifting cylinder having a lifting rod coupled to the lifting block; and a guide housing for guiding the X-axis moving block in the X-axis direction in a state in which the upper end of the X-axis moving block is inserted into the guide housing.

The driving part includes: a Y-axis moving block to which the guide housing is coupled; a grip part guide rail for guiding the Y-axis moving block to slide in the Y-axis direction; a frame to which the grip part guide rail is coupled; and a driving means for controlling strokes of the Y-axis moving block in second stage.

According to the present invention, the coupler having a contaminant draining means and the clean connection device having the same can automatically remove contaminants, such as chemicals, odors, fumes, and the likes, of the wetted surface of the male coupler and the female coupler to provide a clean environment, and effectively clean and dry the wetted portion of the female coupler by the male coupler inside the coupler cleaning module so that a worker can work in a safe environment and remarkably reduce an incidence rate of safety accidents.

Furthermore, the present invention can secure high strength by optimizing the position of the O-ring and using the reinforcing plate when the female coupler and the male coupler are connected and disconnected, thereby providing the coupler which has excellent durability and is structurally stable.

In addition, the present invention can automate coupling and separation operations between the male coupler and the female coupler, which are performed difficult by manpower, so as to significantly improve ease of work, clean and dry the wetted surface to secure clean coupling conditions, prevent external leakage of liquid, and prevent accidents and corrosion caused by chemical contact of equipment and components near the worker.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Figure 1:
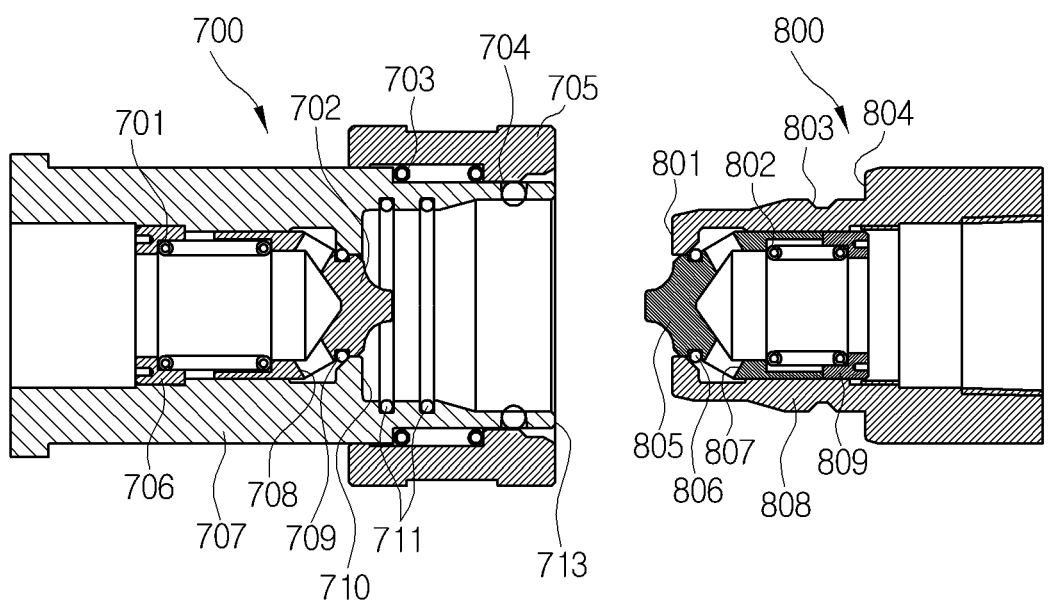
FIG. 1 is a sectional view illustrating a separated state of a conventional coupler.
Figure 2A:
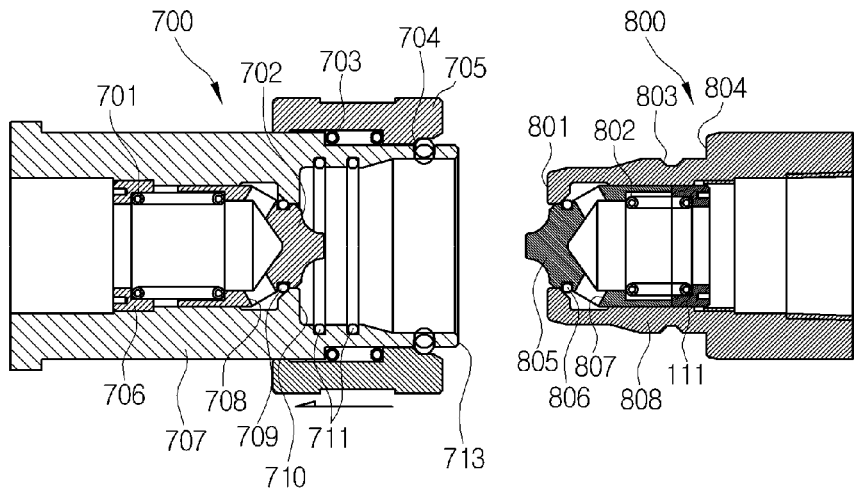
FIGS. 2A, 2B, 3A and 3B are sectional views illustrating a connection procedure between a male coupler and a female coupler of the conventional coupler.
Figure 2B:
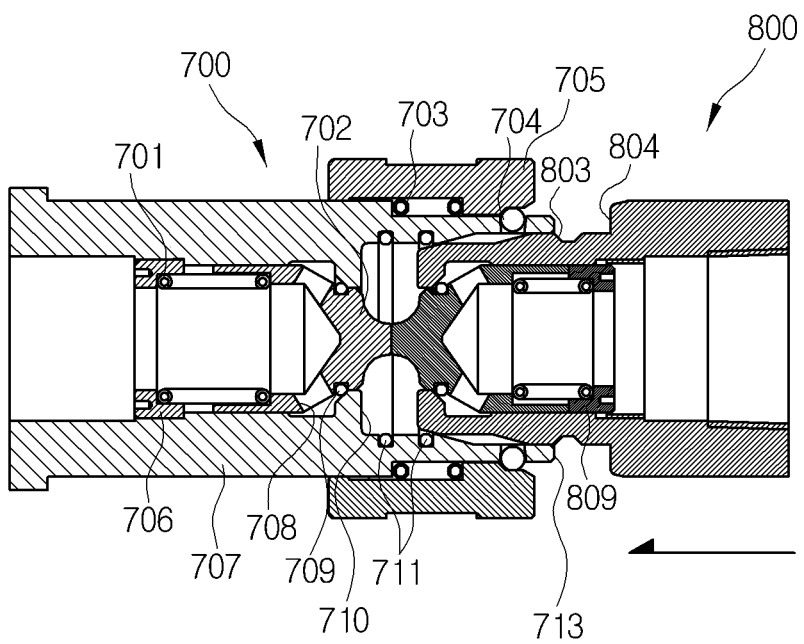
Figure 3A:
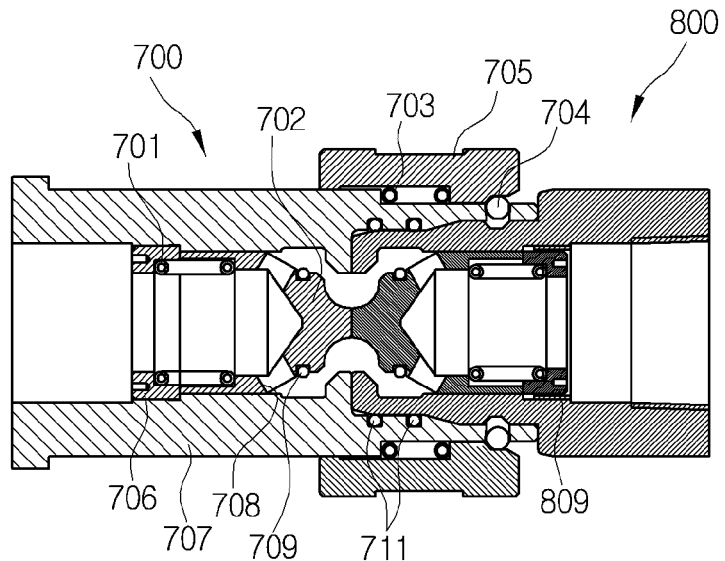
Figure 3B:
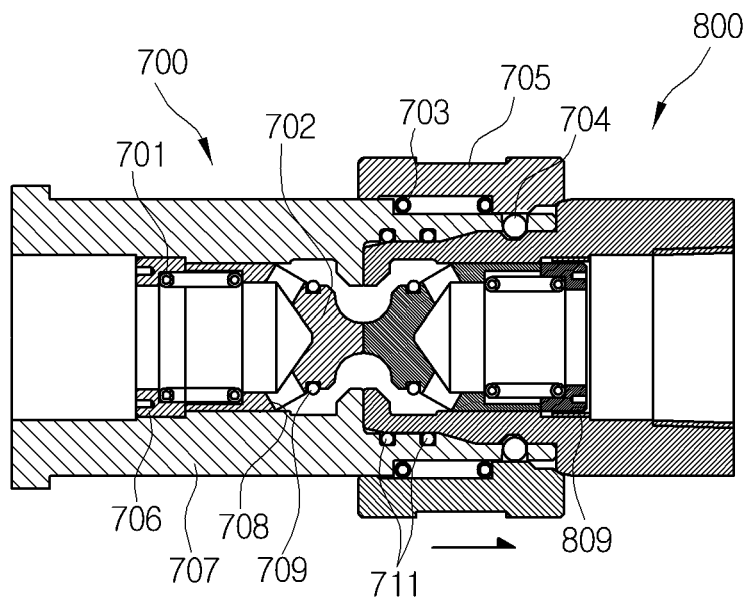
Figure 4A:
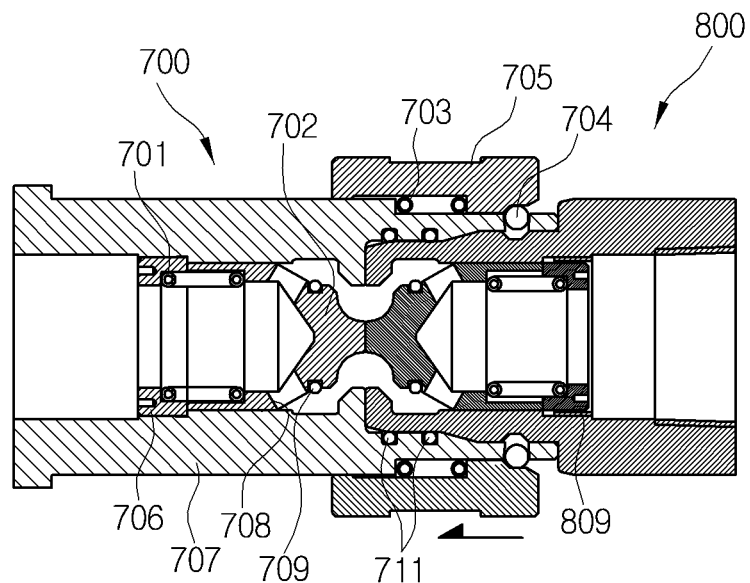
FIGS. 4A, 4B, 5A and 5B are sectional views illustrating a separation procedure between the male coupler and the female coupler of the conventional coupler.
Figure 4B:
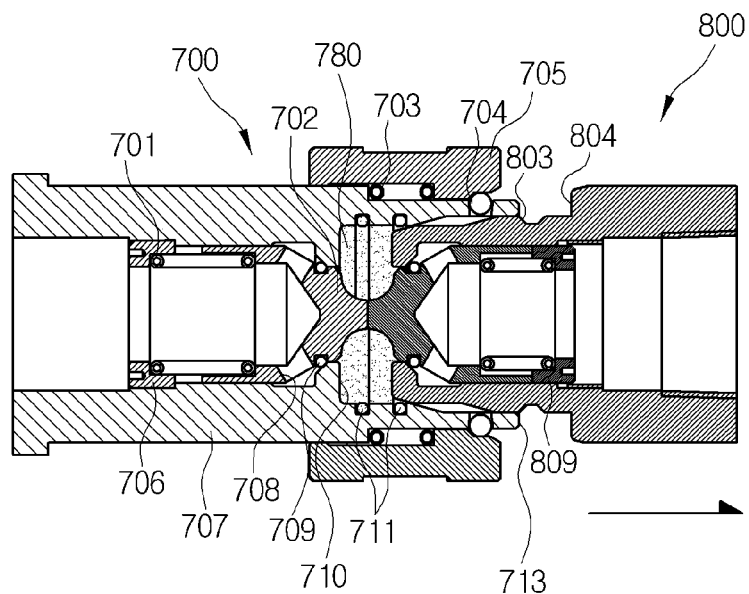
Figure 5A:
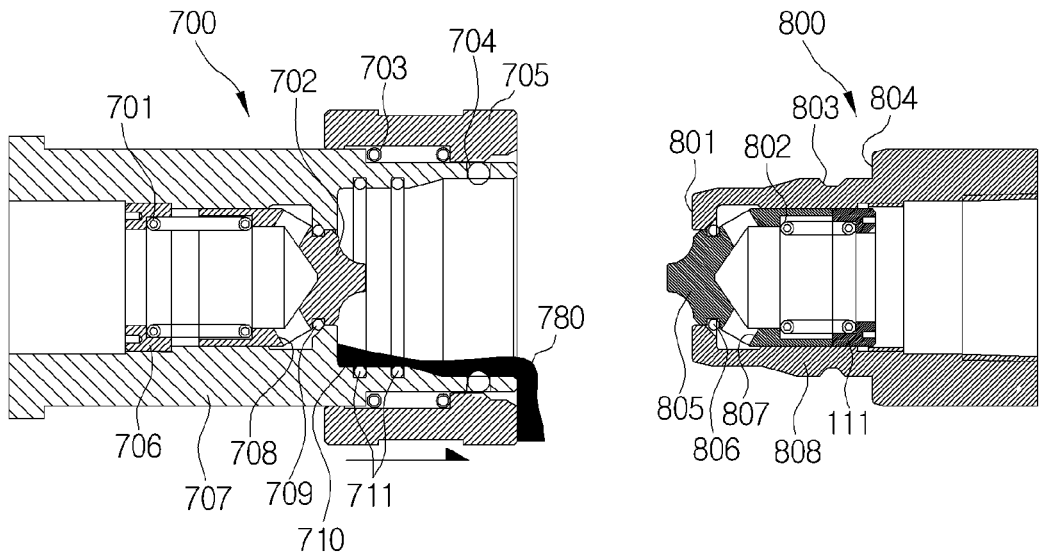
Figure 5B:
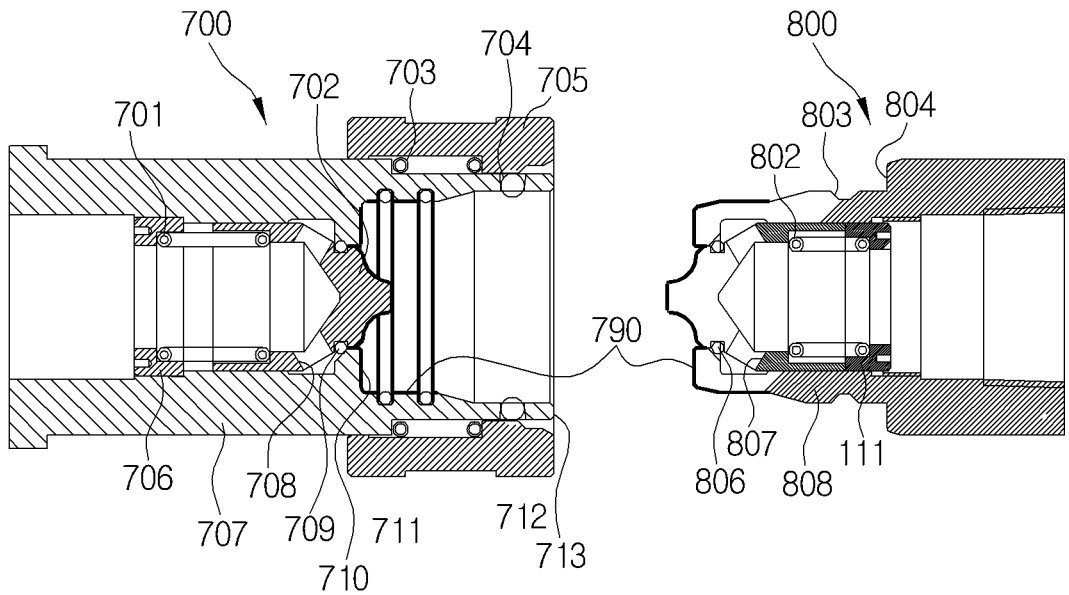
Figure 6:
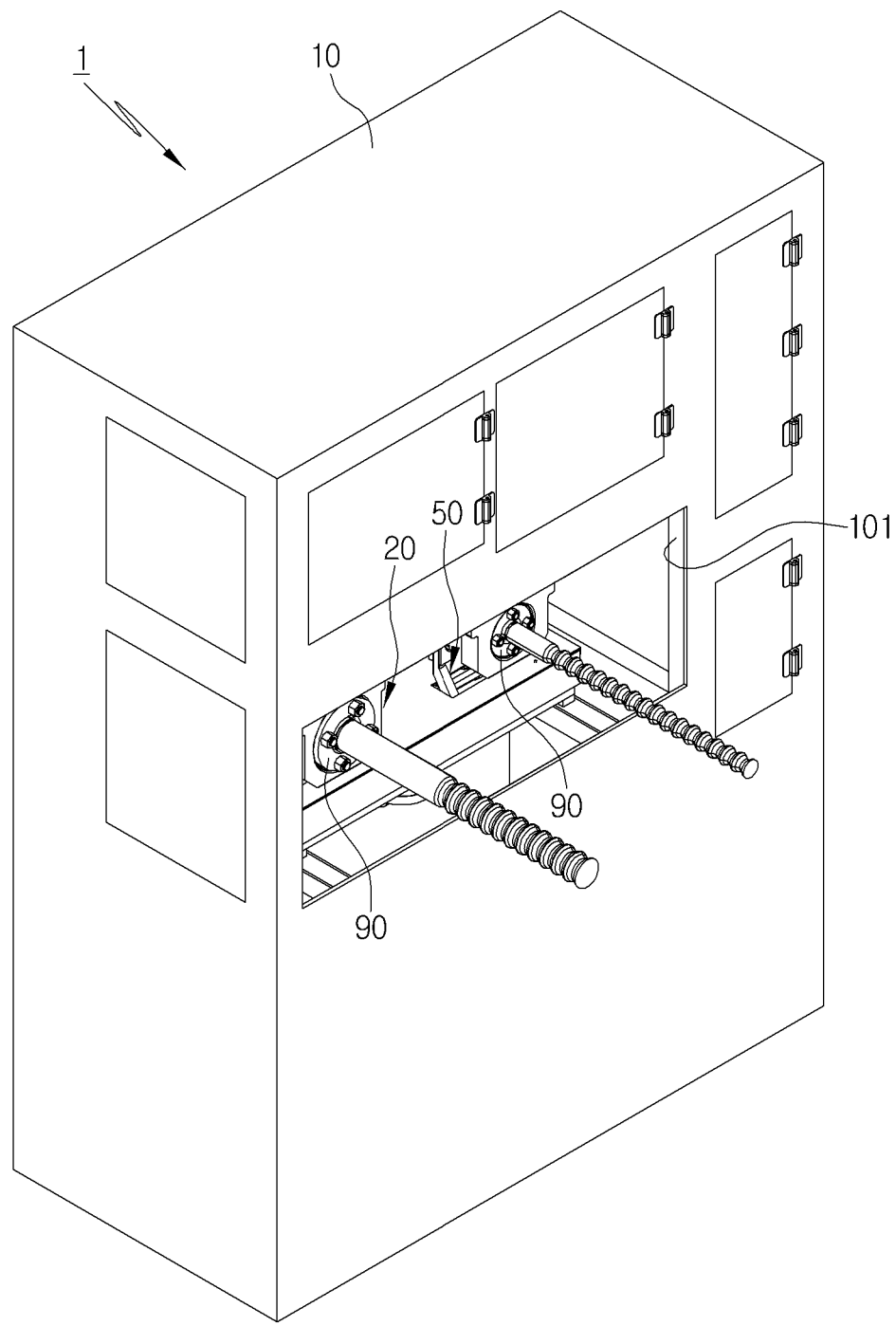
FIG. 6 is a perspective view of a clean connection device according to an embodiment of the present invention.
Figure 7:
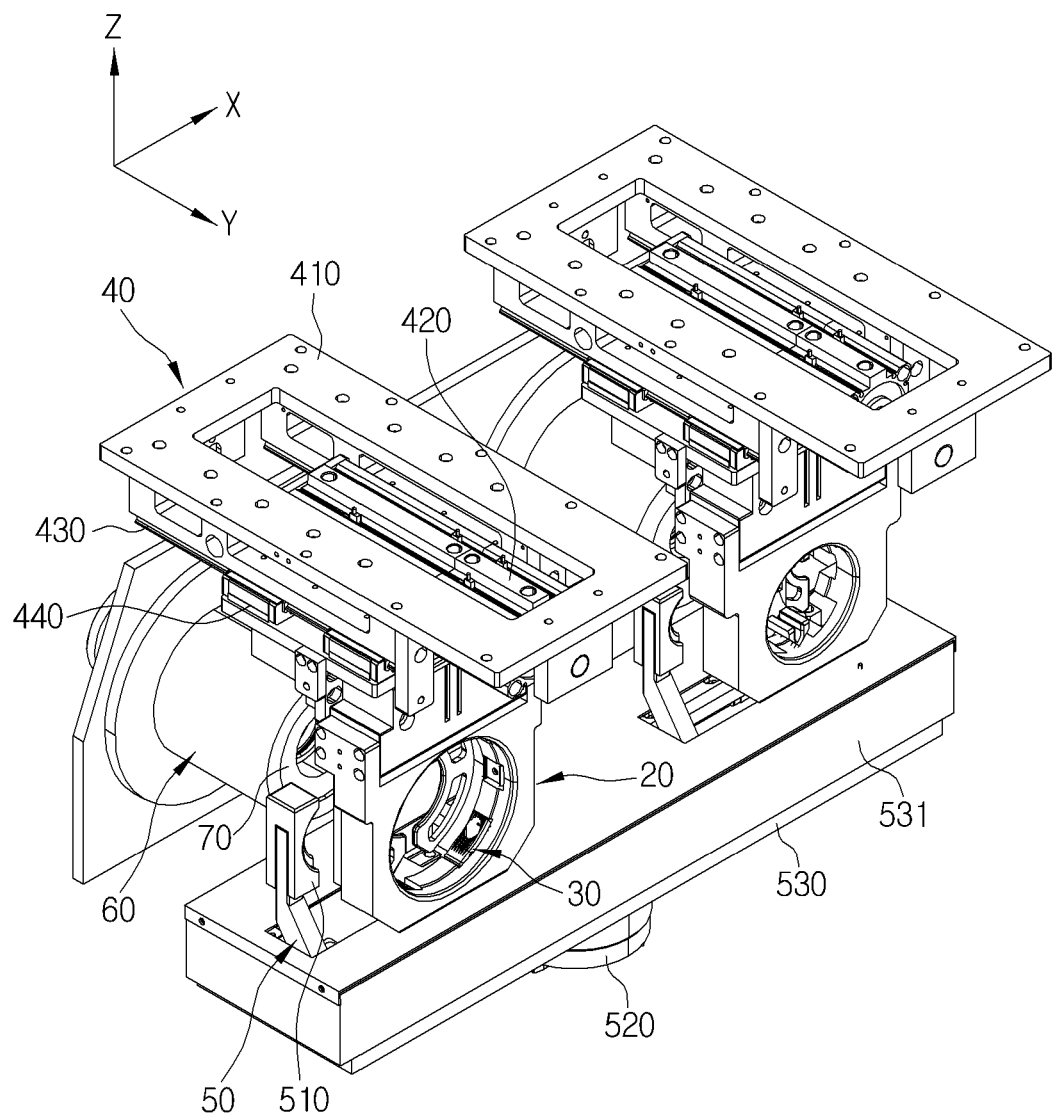
FIG. 7 is a perspective view illustrating the inside of the clean connection device according to an embodiment of the present invention.
Figure 8:
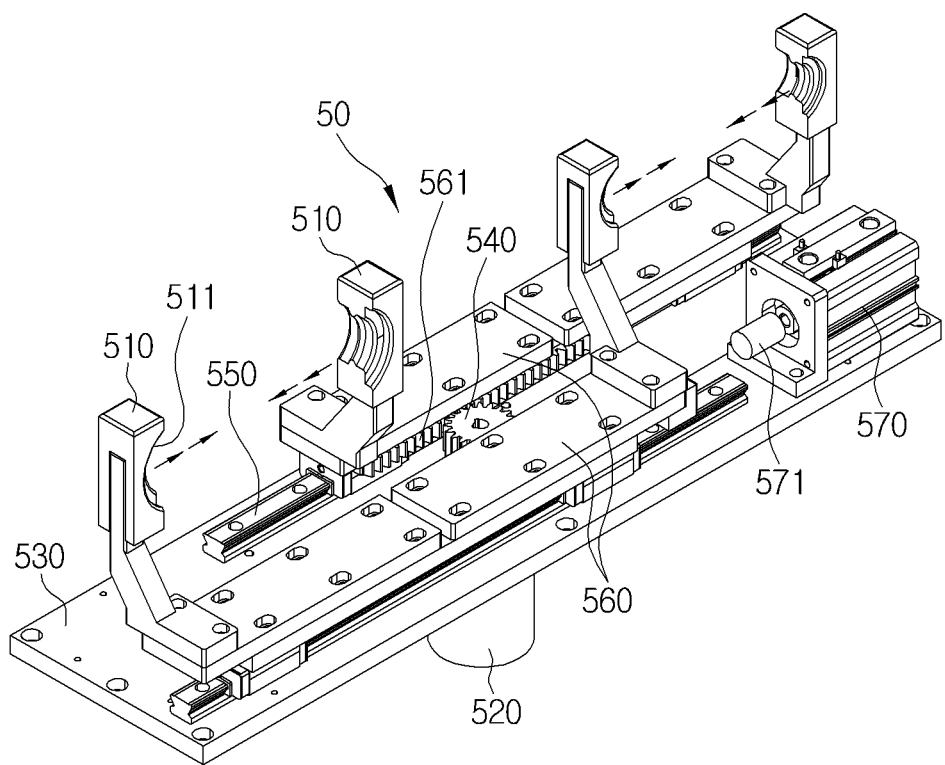
FIG. 8 is a perspective view illustrating an alignment module according to an embodiment of the present invention.
Figure 9:
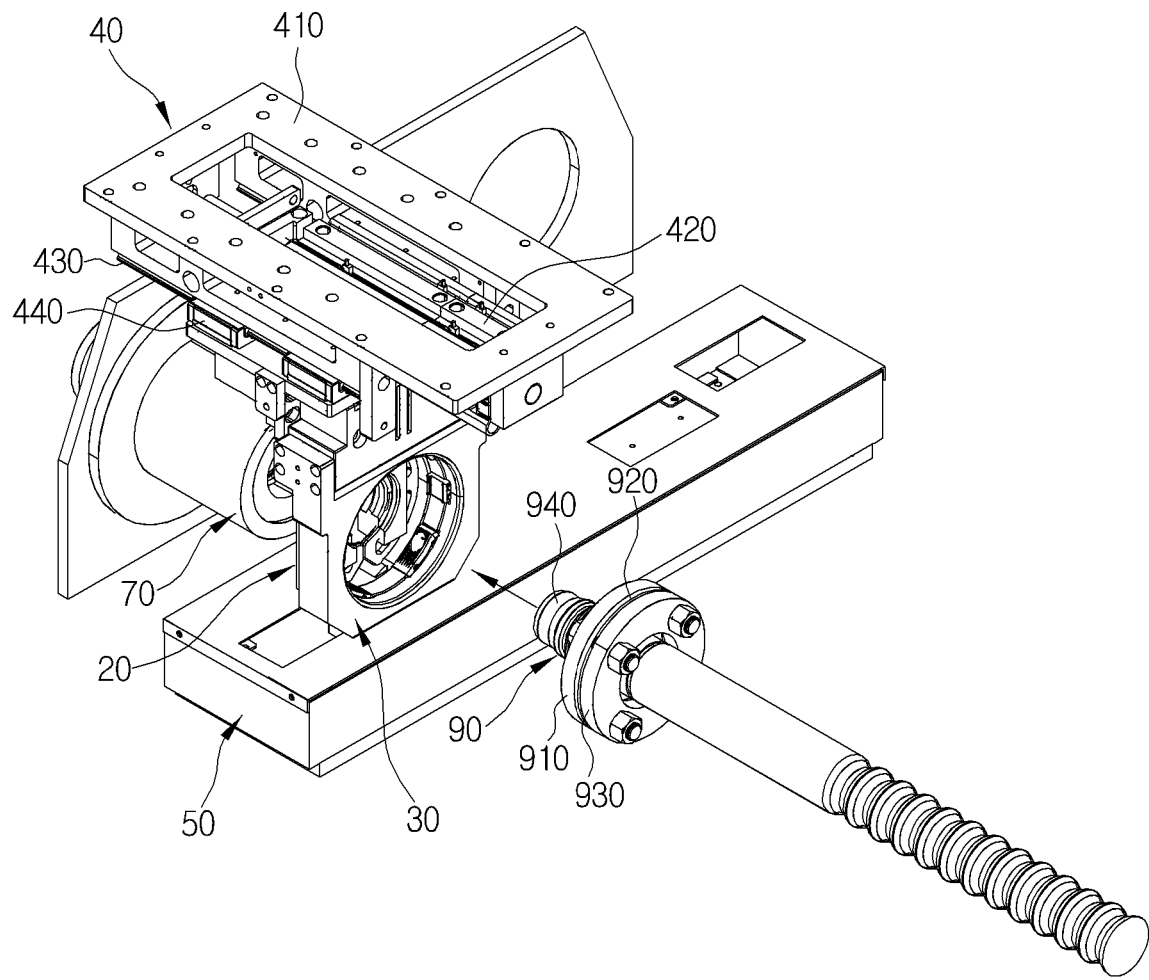
FIG. 9 is a perspective view illustrating an example in which a male coupler is coupled to the clean connection device according to an embodiment of the present invention.

Hereinafter, with reference to the attached drawings, a coupler having a contaminant draining means and a clean connection device having the same will be described in detail. In the following description, the X-axis direction of FIG. 7 is a horizontal direction, the Y-axis direction is an axial direction, and the Z-axis direction is a vertical direction. However, the setting of the directions is for convenience of description, and the present invention is not limited thereto.

Referring to FIGS. 6 to 10, a clean connection device 1 according to an embodiment of the present invention loads or unloads chemicals from one tank to the other tank. For example, the clean connection device 1 can be used in a place where chemicals loaded in a tank lorry in a semiconductor fabrication plant or the like are loaded or unloaded in a storage tank of the plant. The clean connection device 1 includes a main body 10, an alignment module 50, a coupler connection module 20, and a coupler cleaning module.

The main body 10 is mounted between one tank (a storage tank of a plant) and the other tank (tank lorry) and includes a clean female coupler 70. The clean female coupler 70 is connected to the storage tank of the plant, and is connected to or disconnected from a male coupler 90 to connect or disconnect an internal flow path. The male coupler 90 is connected to the tank lorry, and is connected (docked) to the clean female coupler 70 so that chemicals of the storage tank of the plant is loaded into the tank lorry or chemicals of the tank lorry is unloaded to the storage tank of the plant.

The main body 10 is formed in an approximately box shape to form a housing of the clean connection device 1. For example, the main body 10 is mounted in front of the storage tank of the plant, and is configured to connect two male couplers 90 drawn out from the tank lorry which is a large container tank for transporting chemicals. The two male couplers 90 may be configured to be different from each other, for instance, a liquid male coupler and a gas male coupler or the like, have different diameters, and consist of one male coupler 90 or three or more male couplers 90.

The male coupler 90 has a flange 910, and a wetted surface 940 coupled to the clean female coupler 70 is formed at an end portion of the flange 910. The flange 910 is fastened to a hose flange 930 via a bolt, and the hose flange 930 is coupled to an end portion of a hose connected to the tank lorry. A gasket 920 is provided between the flange 910 and the hose flange 930 to secure sealability.

The main body 10 has an inlet 101 formed at the front surface thereof, and the inlet 101 is opened and closed by doors. The doors are respectively provided at upper and lower portions of the inlet 101. One door is opened by rotating upward around an upper portion of the inlet 101 as a hinge shaft, and the other door is opened by rotating downward around a lower portion of the inlet 101 as a hinge shaft. A semicircular groove is formed in the center of the door so that the male coupler 90 can freely move in the Y-axis direction without interfering with the male coupler 90 when the door is opened and closed. A control panel for controlling the operation of the device may be mounted on the main body 10.

The alignment module 50 moves the male coupler 90 in the X-axis direction to align the male coupler 90 in position of the clean female coupler 70. The alignment module 50 includes a base plate 530, a pinion 540, a pinion driving part 520, clamp guide rails 550, a clamp slider 560, an alignment clamp 510, and a two-stage control cylinder 570. The base plate 530 has a predetermined thickness and is formed in a rectangular plate shape elongated in the X-axis direction, and has a cover 531 assembled on the upper portion. The cover 531 has a plurality of holes formed at an upper portion thereof and elongated in the X-axis direction so that the alignment clamp can freely move in the X-axis direction.

The pinion 540 is rotatably connected to the base plate 530. The pinion 540 is arranged at the center of the base plate 530 in the X-axis direction and at the center of the base plate 530 in the Y-axis direction. The pinion driving part 520 rotates the pinion 540, and is a motor vertically fixed to the lower surface of the base plate 530. A motor shaft of the pinion driving part 520 passes through the base plate 530 and is coupled to the pinion 540.

A pair of clamp guide rails 550 are coupled to the upper surface of the base plate 530 and extend in the X-axis direction in parallel, and the pinion 540 is interposed therebetween the clamp guide rails 550. The pair of clamp guide rails 550 are spaced apart from each other in the Y-axis direction and are parallel to each other. The clamp guide rails 550 are connected to the clamp slider 560 to slide the clamp slider 560 in the X-axis direction.

The clamp slider 560 is guided to the clamp guide rails 550 and slides along the clamp guide rails 550 in the X-axis direction. A rack 561 is formed on one surface of the clamp slider 560 facing the pinion 540. The rack 561 is gear-coupled to the pinion 540, and the clamp slider 560 is linearly moved in the X-axis direction by the rotation of the pinion 540.

A pair of alignment clamps 510 are coupled to the upper surface of the clamp slider 560 and reciprocate in the X-axis direction. The male coupler 90 is aligned at a coupling position with the clean female coupler 70 by moving in the X-axis direction of the alignment clamp 510. The alignment clamp 510 has a streamlined curved portion 511 formed on the surface facing the male coupler 90. The curved portion 511 has a shape corresponding to that of the male coupler 90 to increase adhesion with the male coupler 90.

The alignment clamps 510 on both sides with respect to the male coupler 90 are curved in the Y-axis direction to be located on the same line in the X-axis direction. That is, one of the alignment clamps 510 with respect to the male coupler 90 is curved backward from the upper surface of the clamp slider 560, and the other alignment clamp 510 is curved forward from the upper surface of the clamp slider 560. As a result, the curved portions 511 of the alignment clamps 510 getting in close contact with the male coupler 90 are located on the same line in the X-axis direction.

The two-stage control cylinder 570 is coupled to one side of the base plate 530, and restricts and releases the clamp slider 560 in the X-axis direction to control strokes of the clamp slider 560 at two stages. A rod 571 of the two-stage control cylinder 570 moves forward in the X-axis direction toward the clamp slider 560 to restrict the X-axis movement of the clamp slider 560. In addition, the rod 571 of the two-stage control cylinder 570 moves backward in the X-axis direction toward the opposite direction of the clamp slider 560 to release the restriction of the X-axis movement of the clamp slider 560, and thus the clamp slider 560 can move further in the X-axis direction.

When the pair of alignment clamps 510 are maximally opened in the X-axis direction, a grip part 30 of the coupler connection module 20 can freely pass therethrough. At the position where the alignment clamps 510 are maximally opened, when the pinion driving part 520 is operated so as to rotate the pinion 540, the pair of alignment clamps 510 are closed. In this instance, the rod 571 of the two-stage control cylinder 570 restricts the movement of the clamp slider 560 so that the strokes of the clamp slider 560 are controlled in first stage. In this case, the pair of alignment clamps 510 are opened as much as a front end support portion of the male coupler 90 can freely pass through.

Thereafter, when the male coupler 90 is inserted between the pair of alignment clamps 510, the two-stage control cylinder 570 is operated to move the rod 571 backward so that the strokes of the clamp slider 560 are controlled in second stage by driving power of the pinion driving part 520. Accordingly, the male coupler 90 is compressed and restricted while the alignment clamps 510 mounted on the clamp slider 560 come into close contact with each other. As a result, the male coupler 90 inserted between the pair of alignment clamps 510 is aligned by the alignment clamps 510. Thereafter, when the grip of the male coupler 90 is completed by the grip part 30 of the coupler connection module 20 in the state in which the male coupler 90 is aligned, the pinion driving part 520 is operated to rotate the pinion 540 in the opposite direction so that the pair of alignment clamps 510 are maximally opened in the X-axis direction.

The coupler connection module 20 moves the male coupler 90 in the Y-axis direction to connect or disconnect the male coupler 90 to or from the clean female coupler 70. The coupler connection module 20 includes a grip part 30 and a driving unit 40. The grip part 30 grips and fixes the flange 910 of the male coupler 90. The driving unit 40 reciprocates the grip part 30 in the Y-axis direction.

The grip part 30 includes a grip case 310, a pair of grippers 321, a pair of X-axis moving blocks 320, a pair of guide grooves 322, a lifting block 330, a lifting cylinder 340, and a guide housing 350.

A hole through which the flange 910 of the male coupler 90 can pass is formed in the central portion of the grip case 310. The hole formed in the central portion has a diameter enough to allow the flange 910 of the male coupler 90 to freely pass. In addition, a gripper groove 311 for accommodating the gripper 321 and a clamp groove 312 for accommodating a separation prevention clamp 360, which will be described later, are formed along the circumference of the central hole in the grip case 310.

The gripper 321 is assembled to the grip case 310 and bites the flange 910 of the male coupler 90. The grippers 321 are formed in at least a pair, and the pair of grippers 321 are closed in a state in which they face each other, so as to fix the flange 910 of the male coupler 90 by getting in close contact with the outer circumferential surface of the flange 910 of the male coupler 90. A plurality of uneven portions are formed on one side of the gripper 321 facing the male coupler 90 to firmly bite the male coupler 90.

The gripper 321 is fixed to a lower portion of the X-axis moving block 320. The gripper 321 may be integrally formed or separately formed on the X-axis moving block

320. The pair of X-axis moving blocks 320 face each other in the X-axis direction. When the pair of X-axis moving blocks 320 move to get closer to each other in the X-axis direction, the gripper 321 fixes the flange 910 of the male coupler 90. When the pair of X-axis moving blocks 320 move away from each other in the X-axis direction, the gripper 321 releases the flange 910 of the male coupler 90.

The guide groove 322 is diagonally formed on the upper end of the X-axis moving block 320. The X-axis moving block 320 has a groove and a stepped protrusion formed at the upper end thereof, and the guide groove 322 is formed in the protrusion in a diagonal shape. The protrusion is inserted into a horizontal groove 351 of the guide housing 350, which will be described later, to be slid. When the lifting block 330 moves up and down, the guide groove 322 guides the lifting block 330 to move the X-axis moving block 320 in the X-axis direction.

The lifting block 330 is inserted into the pair of guide grooves 322 to be vertically guided. The lifting block 330 has a trapezoidal shape in which a lower portion is narrower than an upper portion in a front view, and both ends of the lifting block 330 are respectively inserted into the guide grooves 322 in the X-axis direction. The lifting block 330 is connected to the lifting cylinder 340 to be elevated, and the X-axis moving blocks 320 are slid in the X-axis direction by the elevation of the lifting block 330.

Figure 10:
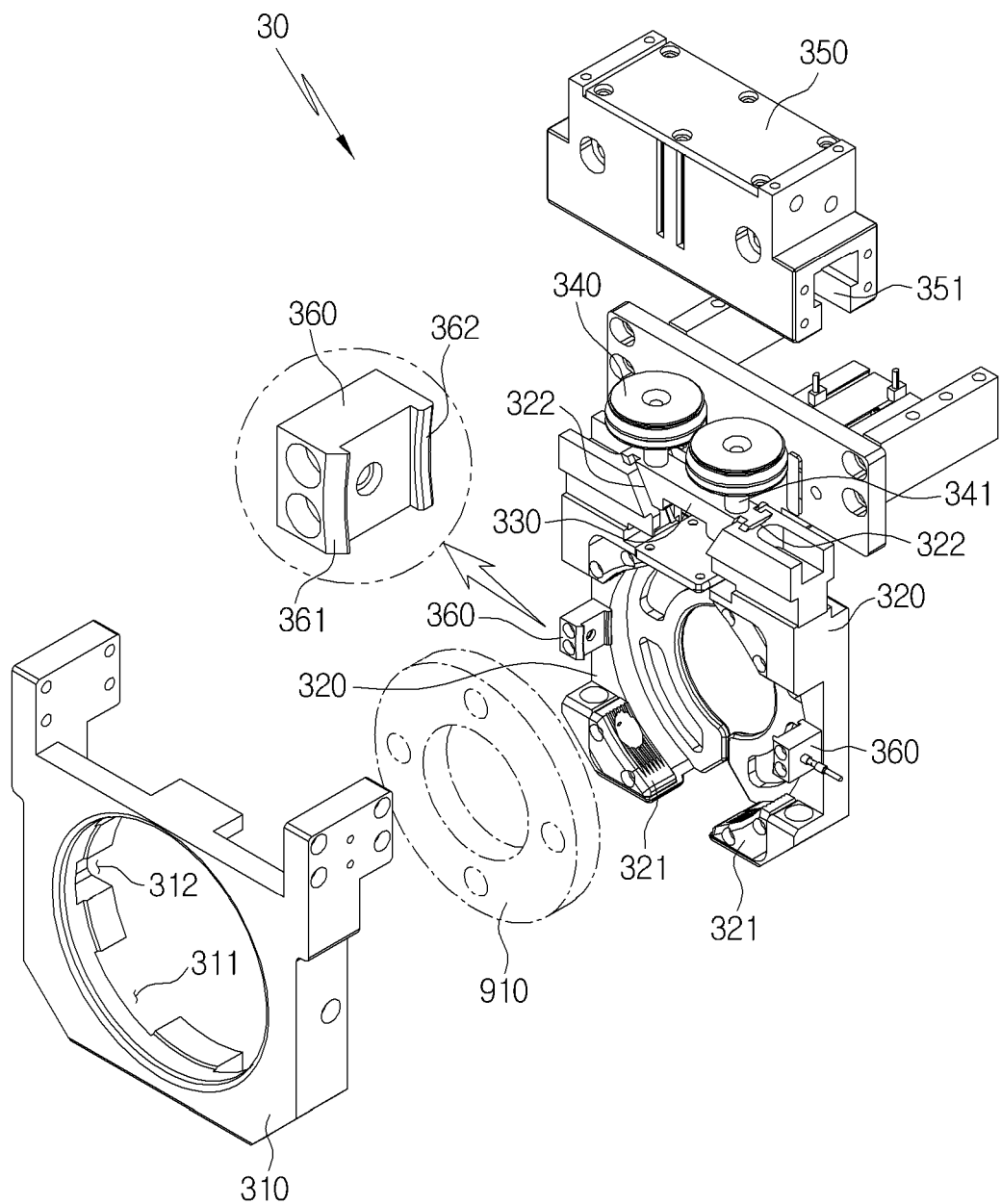
FIG. 10 is an exploded perspective view illustrating a grip portion according to an embodiment of the present invention.
Figure 11:
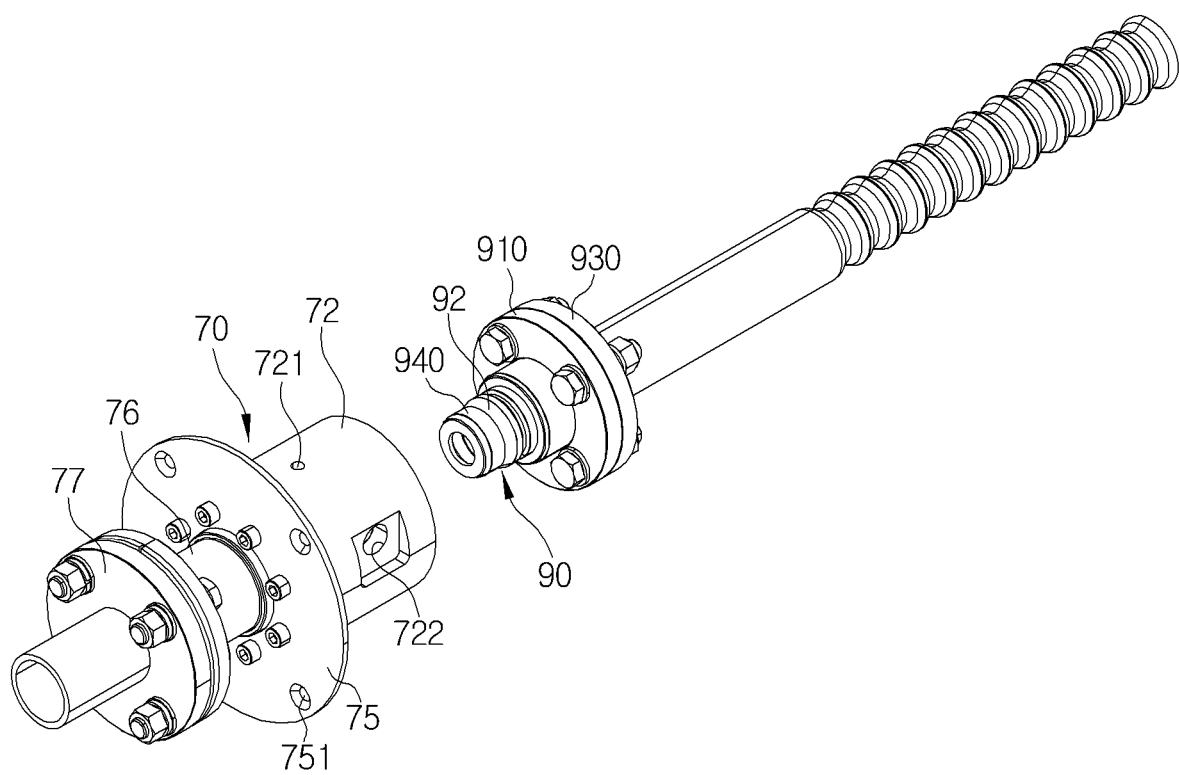
FIG. 11 is an exploded perspective view illustrating a coupler according to an embodiment of the present invention.
Figure 12:
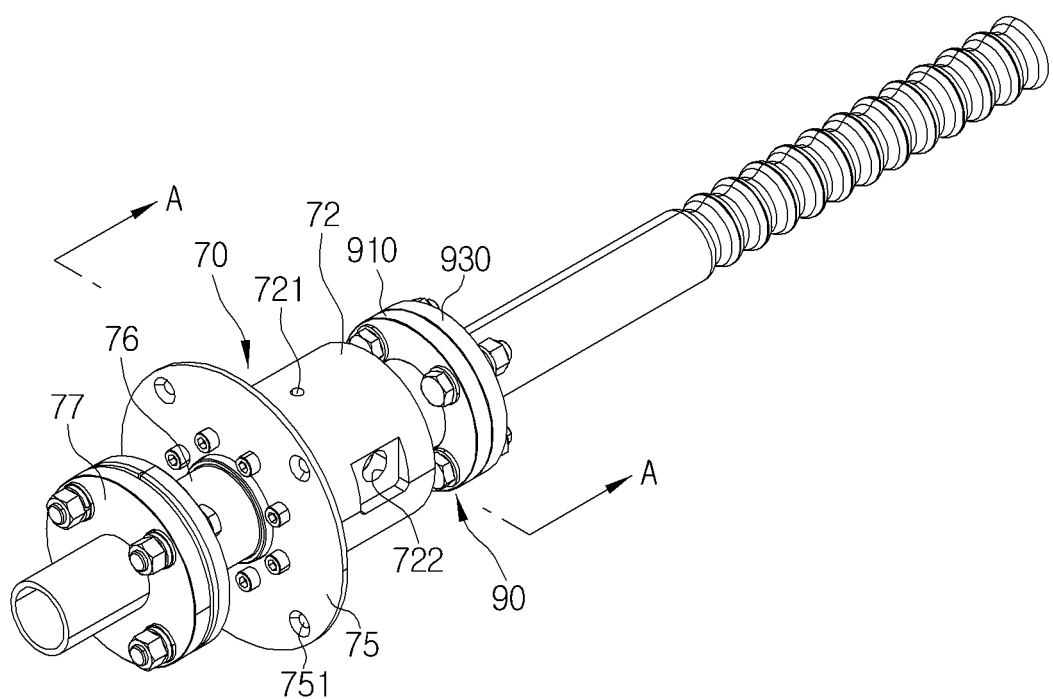
FIG. 12 is a perspective view illustrating a coupler according to an embodiment of the present invention.
Figure 13:
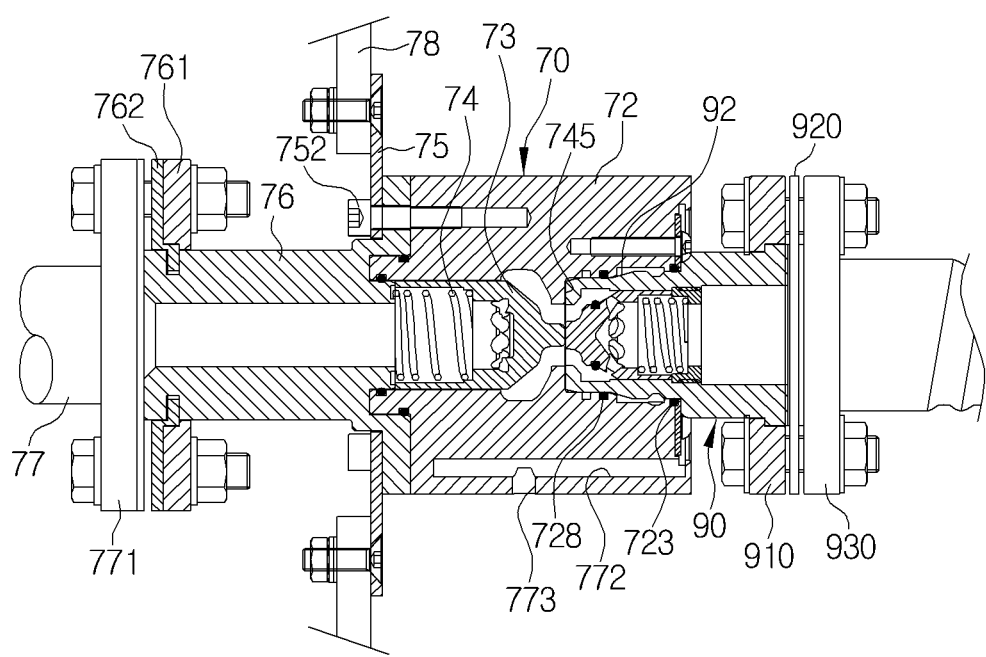
FIG. 13 is a sectional view taken along the line A-A of FIG. 12.

The lifting cylinder 340 has a lifting rod 341 coupled to the lifting block 330. An end of the lifting rod 341 is coupled to the upper end of the lifting block 330. The lifting cylinder 340 includes a cylinder housing and a piston moving inside the cylinder housing. The cylinder housing may be provided inside the guide housing 350. In FIG. 10, only the piston of the lifting cylinder 340 is illustrated. The lifting cylinder 340 provides power for the elevation of the lifting block 330.

An upper end of the X-axis moving block 320 is inserted into the guide housing 350 so that the X-axis moving block 320 is guided to slide in the X-axis direction. Horizontal grooves 351 are formed on both sides of the guide housing 350 in the X-axis direction. An upper protrusion of the X-axis moving block is inserted into the horizontal groove 351 to be slid. The lifting cylinder 340 is embedded in the guide housing 350.

When the lifting cylinder 340 moves the lifting rod 341 downward, the lifting block 330 descends along the guide groove 322 formed in the X-axis moving block 320, and the gripper 321 grips the male coupler 90 by widening a gap between the pair of X-axis moving blocks 320. On the other hand, when the lifting cylinder 340 moves the lifting rod 341 upward, the lifting block 330 rises along the guide groove 322 formed in the X-axis moving block 320 and closes the gap between the pair of X-axis moving blocks 320 to release the gripped state of the male coupler 90.

In addition, the separation prevention clamp 360 is provided on the X-axis moving block 320. The separation prevention clamp 360 is provided on one side surface of each of the pair of X-axis moving blocks 320. The separation prevention clamp 360 is formed to protrude forward from the front surface of the X-axis moving block 320. The separation prevention clamp 360 has a support protrusion, and the support protrusion is spaced apart by the thickness of the flange 910 of the male coupler 90 in the Y-axis direction. The gripper 321 grips the male coupler 90, and at the same time, supports both ends of the flange 910.

That is, the support protrusion includes a first support protrusion 361 and a second support protrusion 362. The first support protrusion 361 and the second support protrusion 362 are formed on both sides of the separation prevention clamp 360 in the Y-axis direction. The first support protrusion 361 and the second support protrusion 362 are caught by both ends of the flange 910 in the Y-axis direction as soon as the gripper 321 grips the male coupler 90, thereby preventing the male coupler 90 from being easily separated from the grip part 30 and increasing fixing force.

In this case, the first support protrusion 361 is formed in an angled shape, and the second support protrusion 362 has a tapered shape of which one surface is inclined. Such a configuration can prevent the gasket 920 provided between the flange 910 of the male coupler 90 and the hose flange 930 from being fit and pressed into one surface of the second support protrusion 362. The tapered shape of the second support protrusion 362 allows the second support protrusion 362 to be easily inserted between the flange 910 and the gasket 920 of the male coupler 90 to be caught and fixed only to the flange 910.

The driving unit 40 includes a Y-axis moving block 440, a grip part guide rail 430, a frame 410, and a driving means 420.

The guide housing 350 of the grip part 30 is coupled to the Y-axis moving block 440. That is, the lower portion of the Y-axis moving block 440 is coupled to the upper end of the guide housing 350. The Y-axis moving block 440 is configured to reciprocate in the Y-axis direction with respect to the frame 410. The Y-axis moving block 440 and the grip part 30 move together in the Y-axis direction so that the male coupler 90 gripped by the grip part 30 moves in the Y-axis direction.

The grip part guide rail 430 is coupled to the frame 410, and extends in the Y-axis direction. The grip part guide rail 430 guides the Y-axis moving block 440 to slide in the Y-axis direction. The frame 410 is fixed to the main body 10. The driving means 420 controls strokes of the Y-axis moving block in two stages to control the male coupler 90 to be located at three positions. The driving means 420 may be composed of two air cylinders, and may be implemented in other forms.

That is, a first air cylinder provides first stage control power to linearly move the Y-axis moving block 440 with respect to the grip part guide rail 430 (to a cleaning/drying position), and a second air cylinder provides second stage control power to linearly move the first air cylinder and the Y-axis moving block 440 (to a coupling-docking position). In this case, the first air cylinder may be a rodless cylinder which can be mounted even in a relatively narrow space compared to the same stroke. In addition, the driving means 420 may be implemented with various driving structures, such as an LM guide, a ball screw, a servo motor, and the like.

The coupler cleaning module cleans or dries wetted surfaces of the male coupler 90 and the clean female coupler 70. Preferably, the coupler cleaning module performs drying after cleaning the wetted surfaces of the male coupler 90 and the clean female coupler 70. The cleaning liquid may be de-ionized water or the like, and drying gas may be air, nitrogen (N2), inert gas, or the like. The coupler cleaning module automatically separates and drains contaminants (chemicals, odors, fumes, etc.) of the wetted surfaces of the male coupler 90 and the clean female coupler 70 to a storage tank without being exposed to the outside, thereby providing a clean environment.

Referring to FIGS. 11 to 16, a coupler including a clean female coupler 70 and a male coupler 90 according to an embodiment of the present invention has a contaminant draining means. That is, the coupler having the contaminant draining means is mounted in the clean connection device 1.

In the following description, the contaminant draining means will be described in detail.

The clean female coupler 70 includes a clean female coupler body 72, a female check plunger 73, and a first elastic member 74. The clean female coupler body 72 is formed in a cylindrical shape, and has a space portion of which one side facing the male coupler 90 is open so that the male coupler 90 is inserted into the space portion. The female check plunger 73 is provided to be slidable in the Y-axis direction (insertion direction) in the space portion of the clean female coupler body 72.

The female check plunger 73 opens and closes a flow path while sliding in the female coupler body 72. The female check plunger 73 has a communication hole formed therein. In a state in which the female check plunger 73 is maximally moved forward (moved to the right in FIG. 14), the internal flow path of the clean female coupler body 72 is closed by the female check plunger 73. When the female check plunger 73 moves backward, the internal flow path of the clean female coupler body 72 is opened through the communication hole.

The first elastic member 74 is provided between the inside of the clean female coupler body 72 and the female check plunger 73. The first elastic member 74 elastically supports the female check plunger 73 to one side in the Y-axis direction (insertion direction) with respect to the clean female coupler body 72. That is, the first elastic member 74 may be a compression spring, and provides an elastic force to move the female check plunger 73 axially with respect to the clean female coupler body 72. In this case, the forward direction of the female check plunger 73 is the right direction of FIG. 14.

The male coupler 90 includes a male coupler body 92, a male check plunger 93, and a second elastic member 94. One side of the male coupler body 92 facing the clean female coupler 70 is opened, and the male coupler body 92 has a space portion formed therein to slidably insert the male check plunger 93 into the space portion. The male check plunger 93 is provided in the inner space portion of the male coupler body 92 to be slidable in the Y-axis direction (insertion direction).

The male check plunger 93 opens and closes the flow path while sliding in the male coupler body 92. The male check plunger 93 has a communication hole formed therein. In a state in which the male check plunger 93 maximally moves forward (moved to the left in FIG. 14), the internal flow path of the male coupler body 92 is closed by the male check plunger 93. When the male check plunger 93 moves backward, the internal flow path of the male coupler body 92 is opened through the communication hole.

The second elastic member 94 is provided between the inside of the male coupler body 92 and the male check plunger 93. The second elastic member 94 elastically supports the male check plunger 93 to one side in the Y-axis direction (insertion direction) with respect to the male coupler body 92. That is, the second elastic member 94 may be a compression spring, and provides an elastic force to move the male check plunger 93 axially with respect to the female coupler body 92. In this case, the forward direction of the male check plunger 93 is the left direction of FIG. 14.

In a state in which the male coupler 90 is completely inserted into the clean female coupler 70, the end of the male coupler body 92 is in close contact with the support part of the clean female coupler body 72, the end of the clean female coupler body 72 is in close contact with the support part of the male coupler body 92, and the female check plunger 73 and the male check plunger 93 push each other so that the internal flow paths are communicated. A locking groove 925 for securing a coupling force between the male coupler and the female coupler by conventional manual coupling is recessed along the circumference of the outer circumferential surface of the male coupler body 92.

The clean female coupler body 72 is coupled to a fastening member 77 connected to the storage tank of the plant through a connection member 76. A two-divided plate member 762 is connected to a flange 771 of the fastening member 77 and a flange 761 of the connection member 76 by bolts. The flange 771 of the fastening member 77 and the flange 761 of the connecting member 76 are screwed to each other by means of bolts so that the fastening member 77 and the connecting member 76 are coupled to each other.

The connection member 76 is coupled to the other end of the clean female coupler body 72. In this case, the other end of the clean female coupler body 72 is opposite to the side into which the male coupler 90 is inserted. A circular plate 75 is coupled to one side of the connection member 76, and has an assembly hole 751 formed therein to be assembled to a coupling part 78 of the main body side. A bolt 752 is assembled by sequentially passing through the circular plate 75, the connection member 76, and the clean female coupler body 72.

Moreover, the clean female coupler body 72 has a first O-ring 723 and a second O-ring 728. The first O-ring 723 prevents the chemical liquid remaining in the clean female coupler body 72 from leaking to the outside before the flow paths of the male coupler 90 and the clean female coupler 70 are opened in the state in which the male coupler 90 is inserted into the clean female coupler body 72. The residual liquid is locked by the O-ring 728 just before the check plungers of the clean female coupler 70 and the male coupler 90 close the flow paths in the process of separating the clean female coupler 70 and the male coupler 90.

Figure 16:
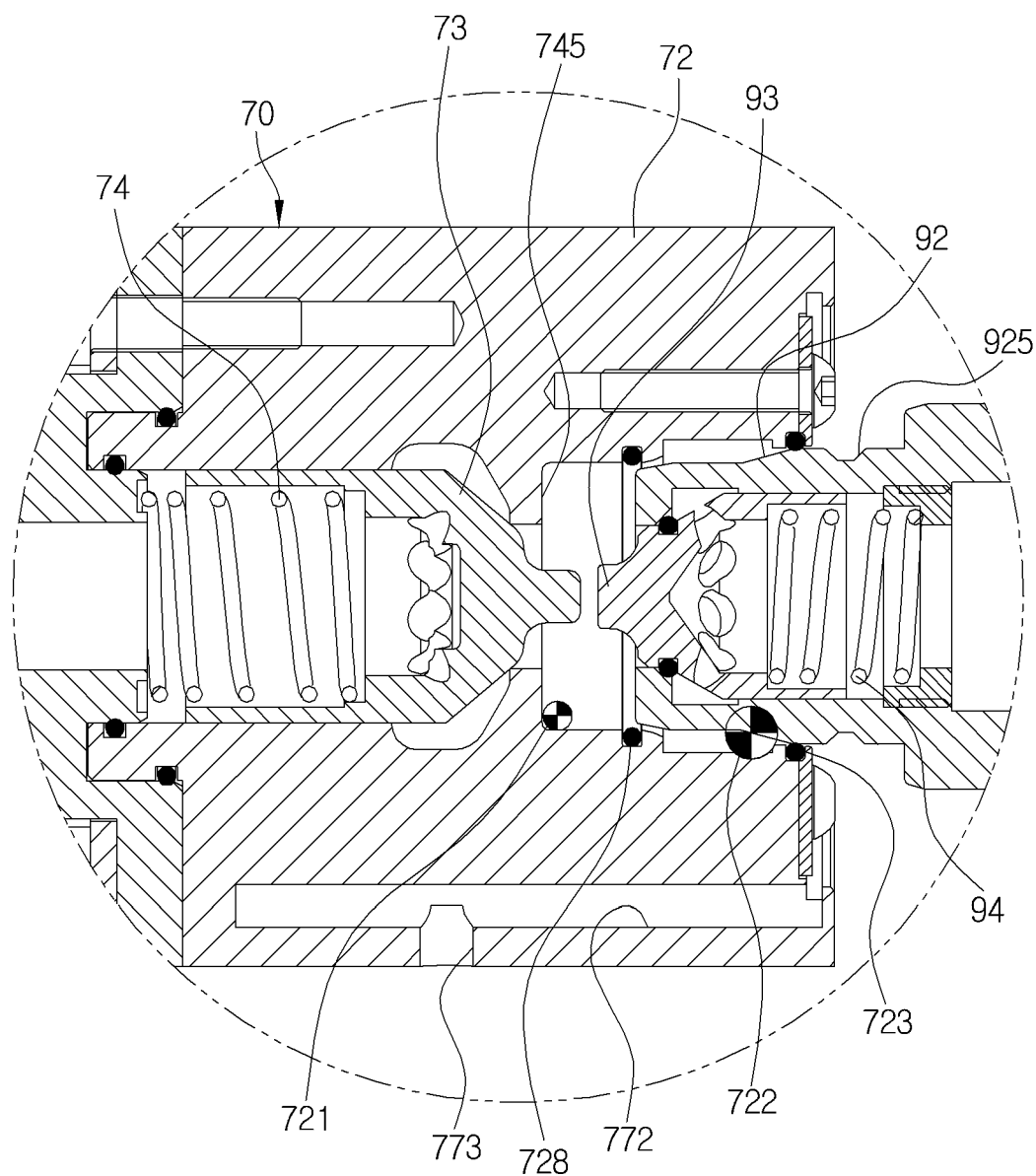
FIG. 16 is an enlarged sectional view illustrating a cleaning/drying position state of a coupler according to an embodiment of the present invention.

Thereafter, in the process of separating the clean female coupler 70 and the male coupler 90, even though the male coupler 90 moves backward in the Y-axis direction and reaches the cleaning and drying position of FIG. 16, the first O-ring 723 seals the gap between the inner circumferential surface of the end side of the clean female coupler body 72 and the outer circumferential surface of the male coupler body 92 so that the residual liquid does not leak to the outside. That is, in the state in which the male coupler 90 is inserted into the clean female coupler body 72 and closes the flow paths of the male coupler 90 and the clean female coupler 70, the chemicals remaining on wetted surfaces 745 and 940 of the male coupler 90 and the clean female coupler 70 do not leak to the outside since not flowing between the male coupler 90 and the clean female coupler 70.

Meanwhile, the clean female coupler 70 includes a reinforcing plate 724. The reinforcing plate 724 is a plate having a thin thickness in the Y-axis direction (insertion direction) and has a circular ring (doughnut) shape. The reinforcing plate 724 is provided on a cross section of the clean female coupler body 72 facing the male coupler 90. A fastening hole 727 is formed in the reinforcing plate 724, and the reinforcing plate 724 is fastened to the clean female coupler body 72 through a bolt 726.

A groove is formed along the circumference between the clean female coupler body 72 and the reinforcing plate 724. The first O-ring 723 is inserted into the groove to be mounted between the clean female coupler body 72 and the reinforcing plate 724. In this case, the clean female coupler body 72 and the reinforcing plate 724 are made of different materials. For example, the clean female coupler body 72 is made of a resin material such as Teflon, and the reinforcing plate 724 is made of a metal material. The reinforcing plate 724 functions to reinforce strength so as to overcome frictional separation force applied to the first O-ring 723 when the male coupler 90 and the clean female coupler 70 are separated.

The second O-ring 728 prevents the chemicals from leaking to the outside in a state in which the male coupler 90 is completely inserted into the clean female coupler body 72 and the flow paths of the male coupler 90 and the clean female coupler 70 are opened. In the state in which the male coupler 90 is completely inserted into the clean female coupler body 72, the second O-ring 728 seals between the inner circumferential surface of the clean female coupler body 72 and the outer circumferential surface of the male coupler body 92. The second O-ring 728 is disposed further inward than the first O-ring 723 in the Y-axis direction (insertion direction).

The coupler cleaning module injects a cleaning fluid or a drying fluid into the inner space of the clean female coupler body 72 in a state (cleaning/drying position) before the male coupler 90 is inserted into the clean female coupler body 72 and the male check plunger 93 and the female check plunger 73 are pressed against each other. An injection port 721 and a discharge port 722 are formed from the outer circumferential surface of the clean female coupler body 72 to the inner space thereof.

Figure 14:
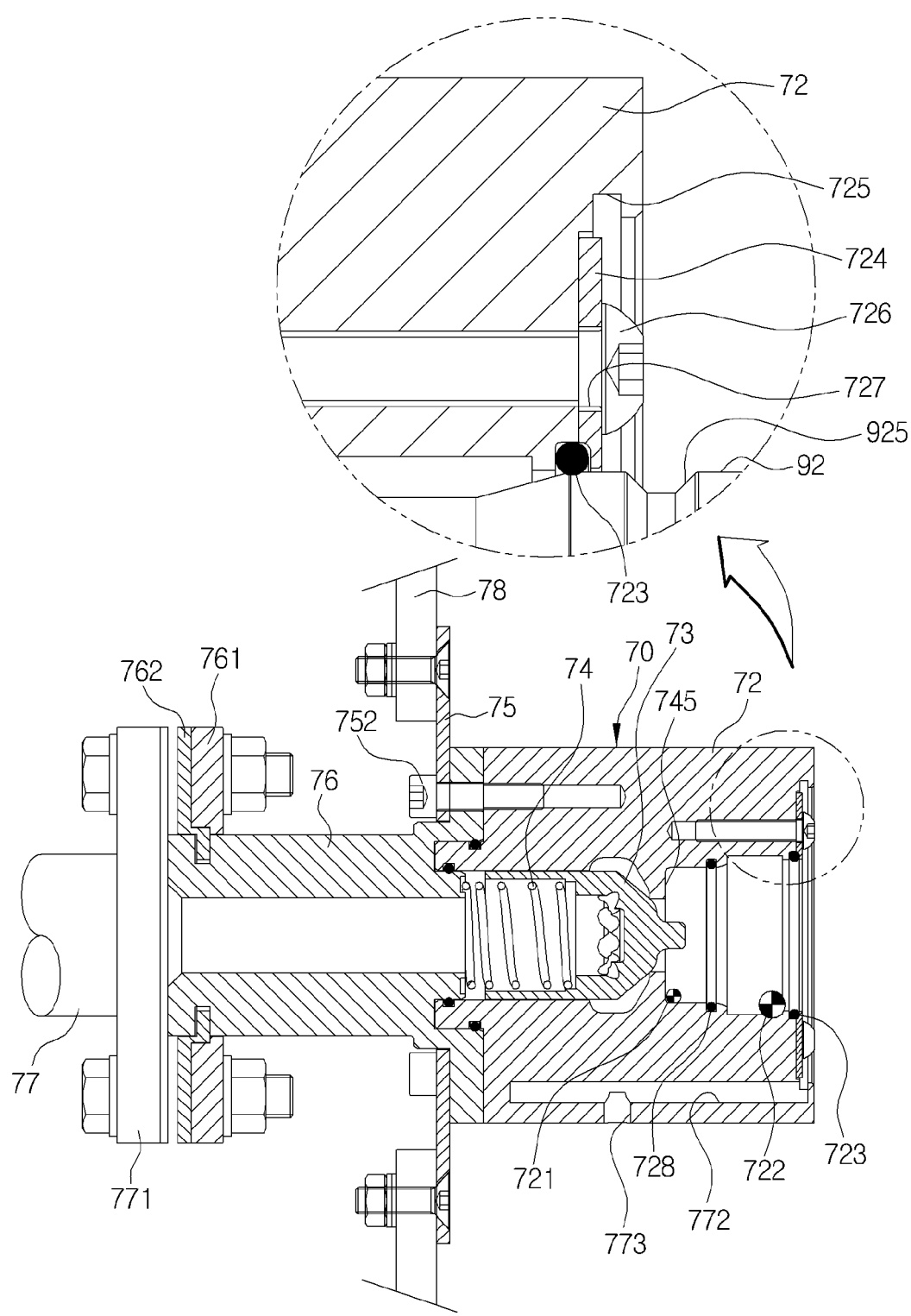
FIG. 14 is a cross-sectional view of a clean female coupler according to an embodiment of the present invention.
Figure 15:
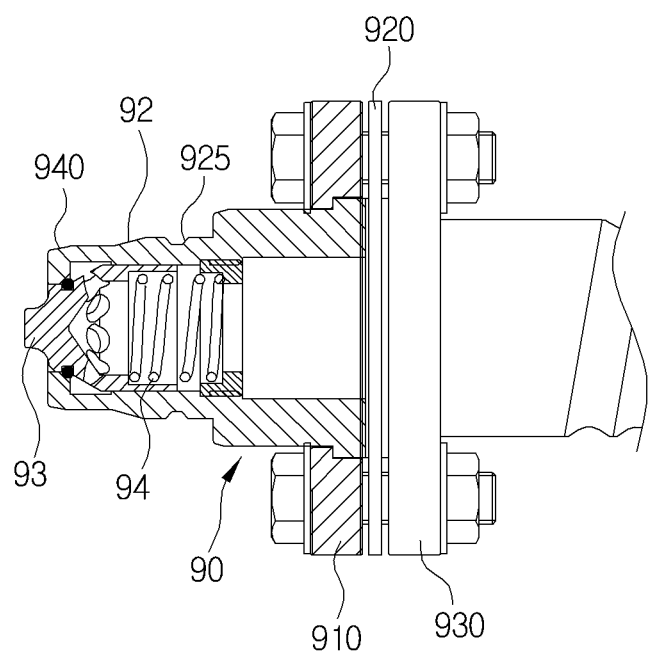
FIG. 15 is a cross-sectional view of a male coupler according to an embodiment of the present invention.

In FIG. 14, the injection port 721 perforated in the cleaning space between the right inner wall of the clean female coupler body 72 and the left of the second O-ring 728 is to supply the cleaning fluid or the drying fluid to the inner space of the clean female coupler body 72, and the discharge port 722 is to drain the cleaning fluid or the drying fluid of the inner space of the clean female coupler body 72. The fluid introduced through the injection port 721 flows in a cyclone form and is drained to the discharge port 722, thereby cleaning or drying the wetted surfaces 745 and 940 of the male coupler 90 and the clean female coupler 70.

The injection port 721 and the discharge port 722 are formed to be spaced apart from each other in the insertion direction (Y-axis direction) of the male coupler 90 and the clean female coupler 70. The injection port 721 may be arranged at 90°, 180°, 270°, and 360° intervals in the circumferential direction with respect to the outlet 722, or may be formed at other angles. The cleaning fluid or the drying fluid introduced into the injection port 721 performs cleaning or drying while flowing the contact surfaces 745 and 940 of the male coupler 90 and the clean female coupler 70 in a cyclone form, and then, is drained to the discharge port 722. In addition, the injection port 721 and the discharge port 722 may be perforated in the tangential direction of the circular inner space to form a cyclone form, or may not be perforated in the tangential direction in the cyclone form if the cleaning fluid or the drying fluid can provide sufficient cleaning or drying.

The discharge port 722 has a diameter larger than that of the injection port 721 so that the cleaning fluid or the drying fluid can be smoothly drained to the outside. When cleaning or drying of the wetted surfaces 745 and 940 of the male coupler 90 and the clean female coupler 70 is completed, the male coupler 90 is completely separated from the clean female coupler 70 and is placed in the cleaning/drying position (FIG. 16). In this case, the residual liquid remaining in the clean female coupler body 72 is diluted with the cleaning solution in the discharge port 722, and then, is drained to a drain/exhaust chamber not to expose dangerous liquids or fumes to the outside.

Meanwhile, the clean female coupler body 72 has a drain space portion 772 and a drain hole 773. The drain space portion 772 is perforated at a lower portion of the clean female coupler body 72, thereby preventing leakage of a very small amount of cleaning water caused by a sealing defect between the male coupler 90 and the first O-ring 723, which may occur during the cleaning and drying process, from dropping to the front part and collecting the leakage.

FIG. 16 is a sectional view of a coupler showing a cleaning/drying position state. Referring to FIG. 16, the male coupler 90 is inserted into a clean female coupler 70 and is positioned in a cleaning/drying position. When the male coupler 90 is coupled to the clean female coupler 70, the male coupler 90 is positioned in the cleaning/drying position in which the male coupler 90 is not completely inserted into the clean female coupler 70 but only a portion is inserted. In the cleaning/drying position state, the first O-ring 723 seals between the clean female coupler 70 and the male coupler 90.

The cleaning fluid and the drying fluid are supplied through the injection port 721, and are drained through the discharge port 722 to perform cleaning and drying of the wetted surfaces of the male coupler 90 and the clean female coupler 70. In the cleaning/drying position state, the male check plunger 93 and the female check plunger 73 do not come into contact with each other, and a minute gap is formed between the second O-ring 728 and the male coupler body 92. The cleaning fluid can pass through the gap. When cleaning and drying are completed, the male coupler 90 is in a coupling/docking position (the state of FIG. 13) in which the male coupler 90 is fully inserted into the clean female coupler 70. When the male coupler 90 is separated from the clean female coupler 70, the male coupler 90 is in a cleaning/drying position in which the male coupler 90 is not completely separated from the clean female coupler 70 but only a portion of the male coupler 90 is separated. This position state is the same as the cleaning/drying position in which only a portion of the male coupler 90 of FIG. 16 is inserted into the clean female coupler 70.

The locking groove 925 formed in the male coupler body 92 has a shape in which both sides are inclined at approximately 45° in the Y-axis direction. When the male coupler 90 is coupled to the clean female coupler 70, the first O-ring 723 is seated in the locking groove 925, and then, goes over the locking groove 925 by a predetermined force or more, and the male coupler 90 is completely inserted into the end of the clean female coupler 70. In particular, when the male coupler 90 is separated from the clean female coupler 70, the first O-ring 723 easily passes the acute angle inclined surface of the locking groove 925 but goes over an obtuse inclined surface by the predetermined force or more. In this instance, the reinforcing plate 724 which couples the first O-ring 723 receives an extremely large force. If only the female coupler body couples the first O-ring without the reinforcing plate, in a case in which the female coupler body is made of a resin material, the coupled portion of the first O-ring is torn when the male coupler is separated. However, the reinforcing plate 724 can solve the problem since being made of a metal material.

Figure 17:
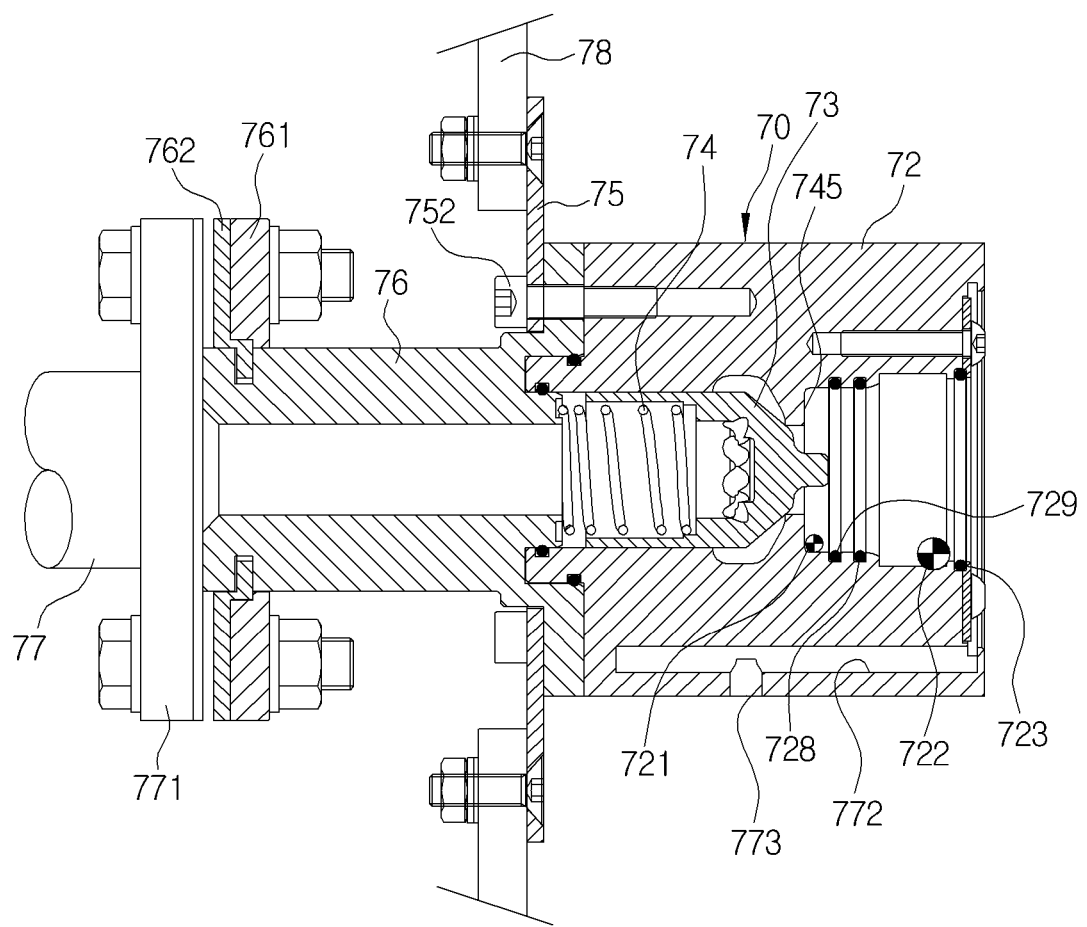
FIG. 17 is a sectional view of a female coupler according to a modification of FIG. 14.

Meanwhile, referring to FIG. 17, a clean female coupler 70 according to a modification of the present invention may further include a third O-ring 729. The third O-ring 729 is provided in the inner space of the clean female coupler body 72 and functions to doubly prevent the leak of the chemicals together with the second O-ring 728. The third O-ring 729 is spaced apart from the second O-ring 728 in the insertion direction (Y-axis direction) of the male coupler 90 and the clean female coupler 70 to doubly prevent leak of the chemicals.

An operational example of the coupler according to the embodiment of the present invention will be described in detail with reference to FIGS. 18 to 23.

Figure 18:
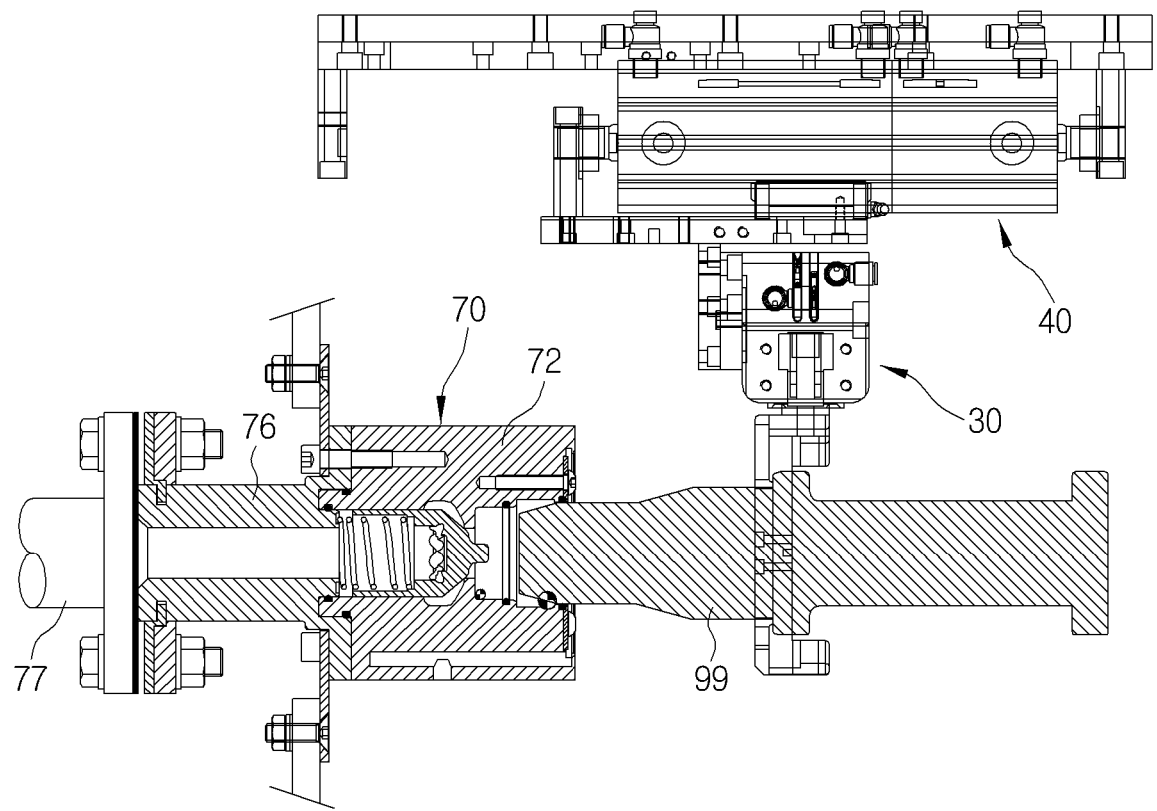
FIGS. 18 to 23 illustrate connection and separation procedures of a coupler according to an embodiment of the present invention.

First, a worker opens a front door of the main body 10, and removes a plug 99 inserted into the clean female coupler 70 as illustrated in FIG. 18. Thereafter, the worker operates the pinion driving part 520 so as to close the alignment clamp 510 in first stage in the X-axis direction. In a state in which the male coupler 90 is tightly positioned between the pair of alignment clamps 510 in the state in which the alignment clamp 510 is closed in first stage, when the two-stage control cylinder 570 is operated, the alignment clamp 510 is retracted in second stage in the X-axis direction so that the male coupler 90 is accurately aligned in the X, Y, and Z-axis directions.

When the lifting cylinder 340 is operated immediately after aligning the male coupler 90, the gripper 321 bites the outer circumferential surface of the flange 910 of the male coupler 90. Thereafter, the pinion driving part 520 is operated in the opposite direction to open the alignment clamp 510 to secure a passage through which the gripper 321 can move. In the same way, another male coupler 90 is aligned and bitten to another clean female coupler 70 next to the above coupler. The above operation is programmed to be operated by a manual switch or a controller (not shown). Thereafter, the front door of the main body 10 is closed, and then, a control panel is operated to perform an automatic running.

Figure 19:
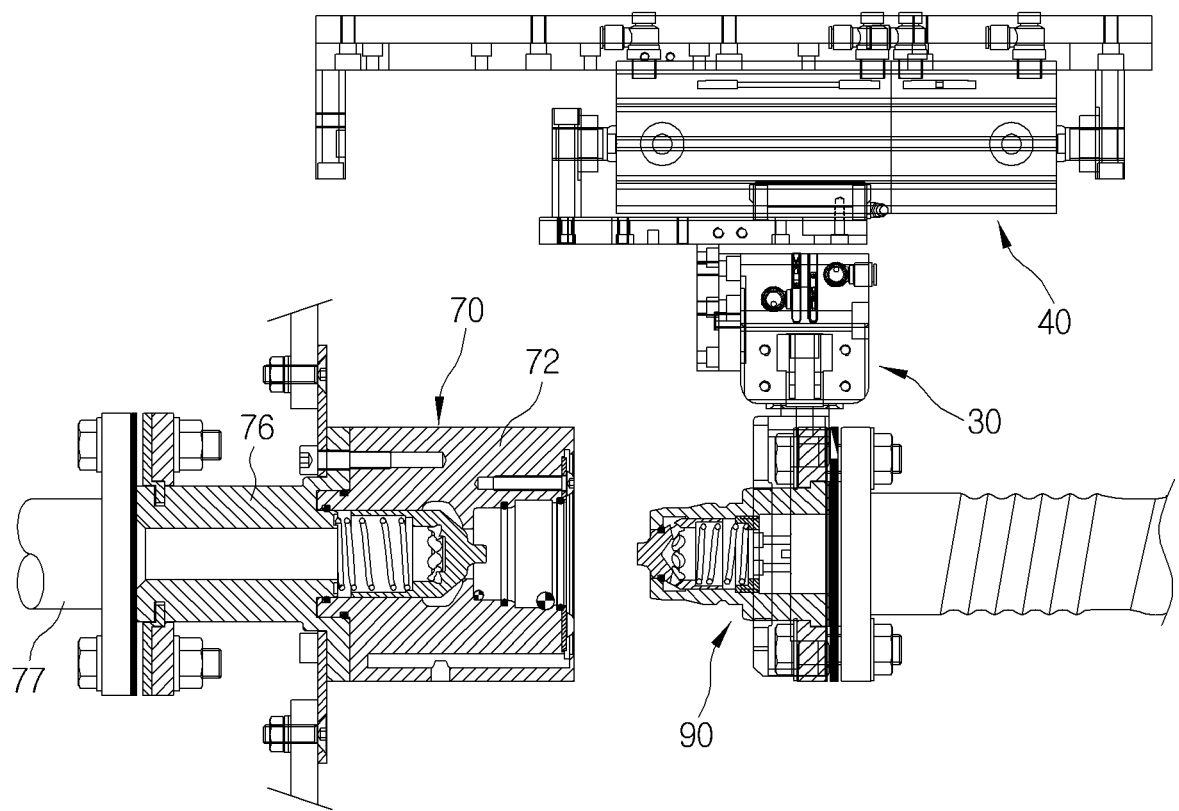
Figure 20:
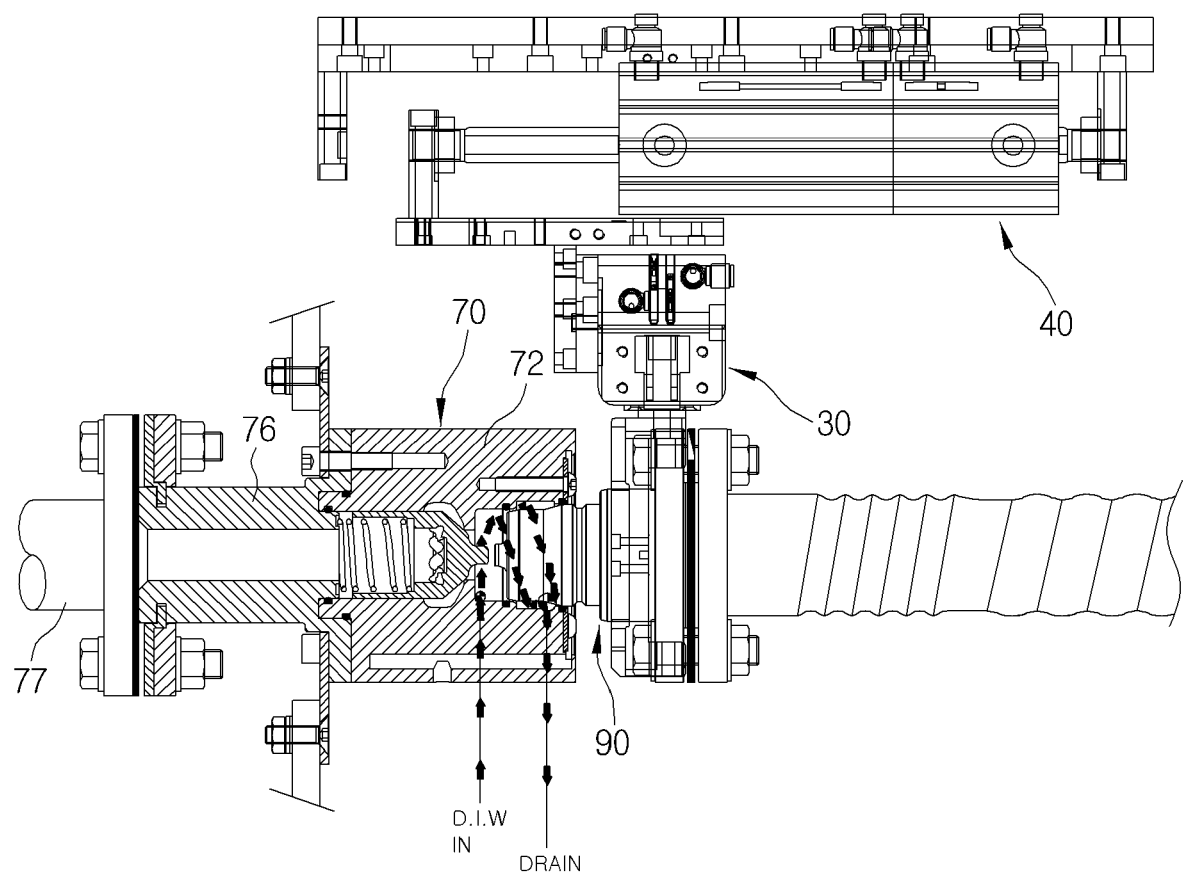

When the automatic running starts, as illustrated in FIG. 19, the male coupler 90 is gripped, and the driving means 420 is operated to insert and move the male coupler 90 into the clean female coupler 70. As illustrated in FIG. 20, in the cleaning/drying position state in which the male coupler 90 is partially inserted into the clean female coupler 70, the first O-ring 723 seals between the male coupler 90 and the clean female coupler 70. In this instance, the flow paths of the male coupler 90 and the clean female coupler 70 are closed.

Figure 21:
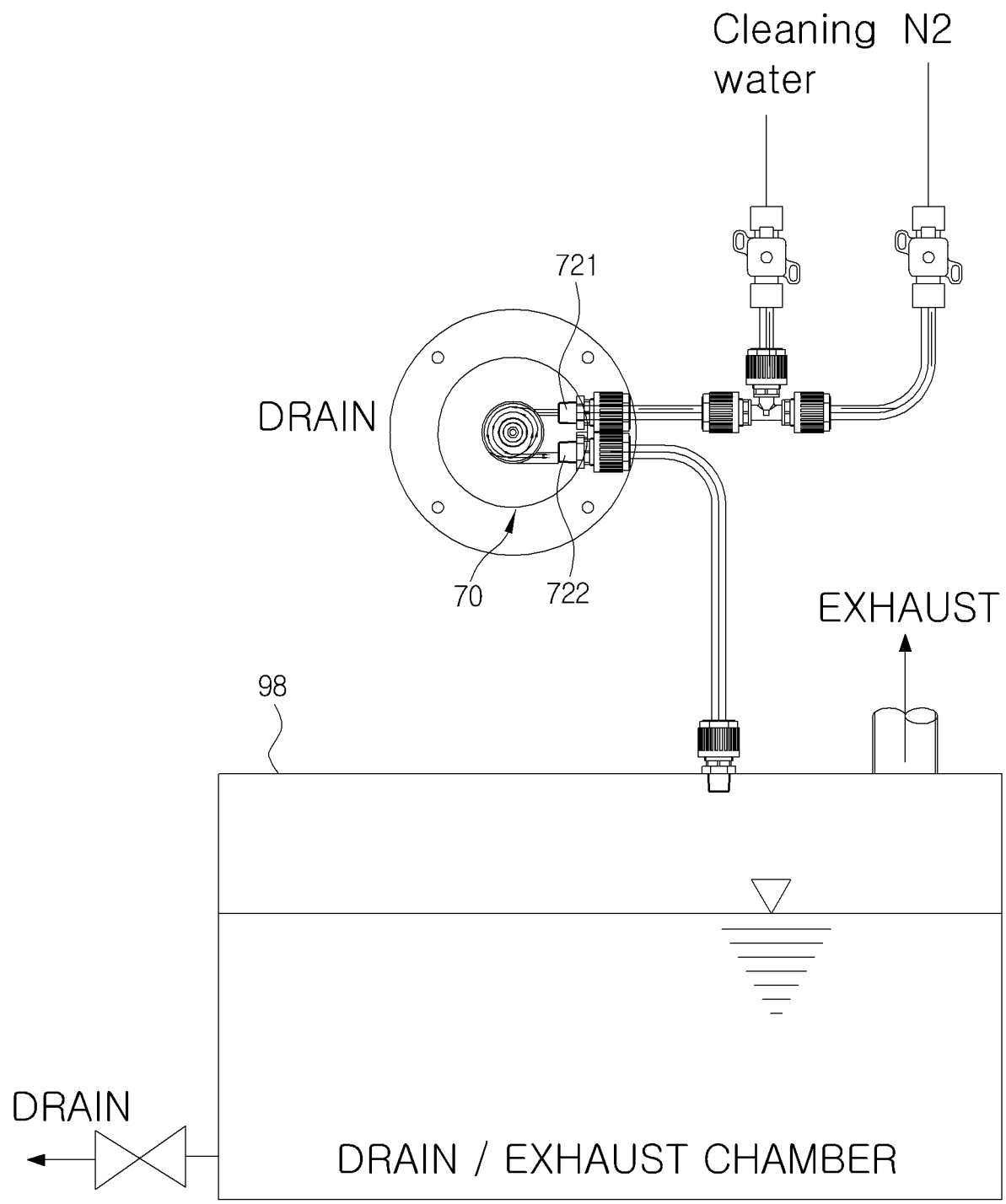

Thereafter, as illustrated in FIG. 21, the coupler cleaning module is operated to clean or dry the wetted surfaces of the male coupler 90 and the clean female coupler 70. De-ionized water, which is a cleaning liquid, is supplied through the injection port 721 formed in the clean female coupler 70 to perform cleaning, and then, nitrogen (N2) or compressed air is supplied to perform drying. In the cleaning/drying process, the liquid drained to the discharge port 722 flows to the drain/exhaust chamber 98 so that the liquid is drained to a drain pipe and the gas is drained through an exhaust pipe.

Figure 22:
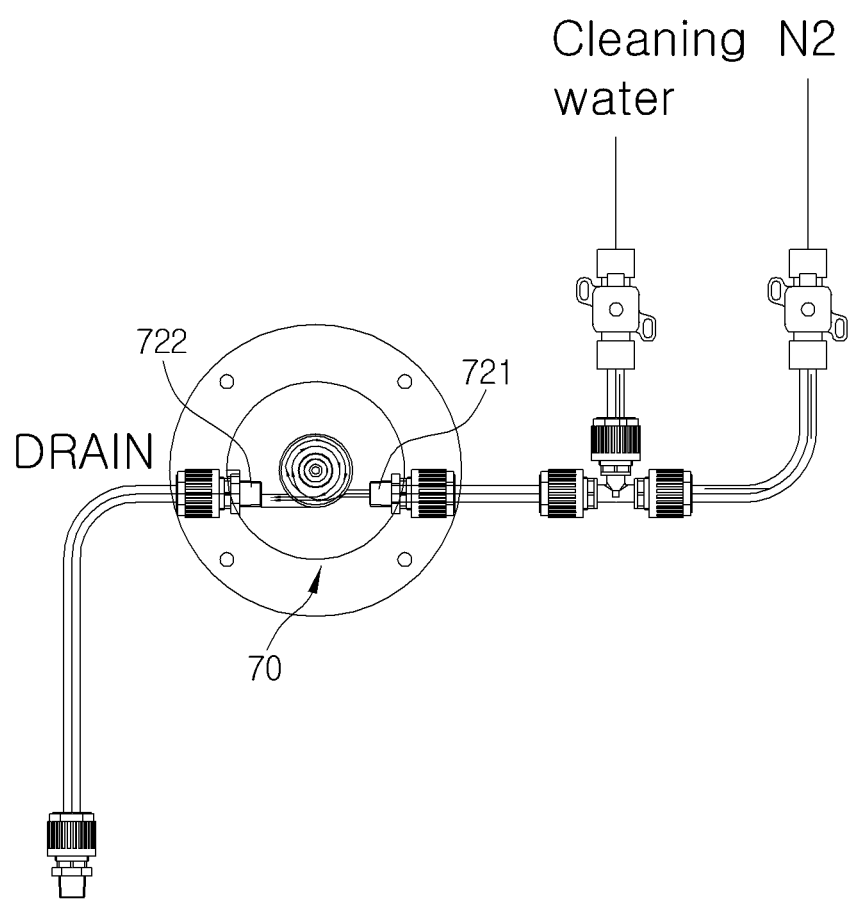

The cleaning liquid supplied to the injection port 721 flows on the wetted surfaces of the male coupler 90 and the clean female coupler 70 in a cyclone form, and then, is drained to the discharge port 722. In this instance, the injection port 721 and the discharge port 722 may be arranged in the same direction as illustrated in FIG. 21 or may be arranged at an interval of 180° as illustrated in FIG. 22.

Figure 23:
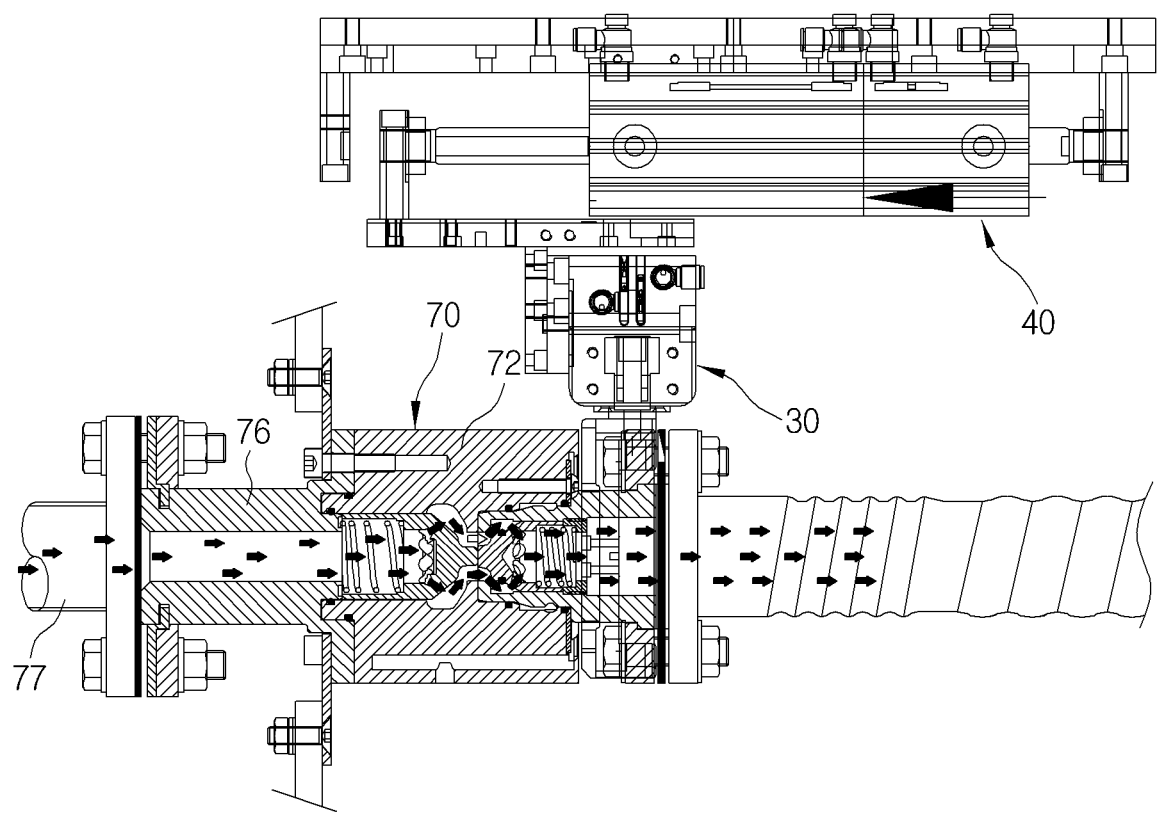

When the cleaning and drying are completed, as illustrated in FIG. 23, the driving means 420 is operated to completely fasten the male coupler 90 to the clean female coupler 70. In this instance, the male check plunger 93 and the female check plunger 73 push each other to open the flow paths, so that the chemicals flow from the clean female coupler 70 to the male coupler 90. In this case, the second O-ring 728 seals the gap between the male coupler 90 and the clean female coupler 70 to prevent leak of the chemicals.

The coupler having the contaminant draining means and the clean connection device having the same according to the present invention have been described with reference to the embodiment illustrated in the drawings, but this is merely an example, and it will be understood by those skilled in the art that various modifications and other equivalents are possible. Accordingly, the true technical protection scope should be determined by the technical spirit of the appended claims.

What is claimed is:

1. A coupler mounted in a clean connection device including a clean female coupler and a male coupler to load and unload chemicals from one tank to another tank, comprising:
   the male coupler including a male check plunger for opening and closing a flow path in the male coupler while sliding in a male coupler body;
   the clean female coupler including a female check plunger for opening and closing a flow path in the clean female coupler while sliding in a clean female coupler body;
   a coupler cleaning module for cleaning and drying wetted surfaces of the male coupler and the clean female coupler;
   a first O-ring for preventing chemical liquid remaining on the wetted surfaces of the male coupler and the clean female coupler from leaking to outside in a state in which the male coupler is inserted into the clean female coupler body, wherein the flow paths of the male coupler and the clean female coupler are closed; and
   a circular ring-shaped reinforcing plate disposed on a cross section of the clean female coupler body facing the male coupler;
   wherein the coupler cleaning module injects a cleaning fluid or a drying fluid into an inner space of the clean female coupler body in a state in which the male coupler is inserted into the clean female coupler body and before the male check plunger and the female check plunger come into contact with each other,
   wherein a fastening hole is disposed in the reinforcing plate, and the reinforcing plate is fastened to the clean female coupler body via a bolt,
   wherein a groove is disposed along a circumference between the clean female coupler and the reinforcing plate,
   wherein the first O-ring is inserted into the groove to be mounted between the clean female coupler body and the reinforcing plate,
   wherein the clean female coupler body includes a second O-ring for preventing the chemical liquid from leaking to the outside in a state in which the male coupler is inserted into the clean female coupler body and the flow paths of the male coupler and the clean female coupler are open, and
   wherein, in the coupler cleaning module, a minute gap is disposed between the second O-ring and the male coupler body in a state in which the male coupler is inserted in the clean female coupler and before the male check plunger and the female check plunger come into contact with each other, and the cleaning fluid passes through the minute gap.

2. The coupler according to claim 1, wherein the clean female coupler body is formed in a cylindrical shape and comprises an injection port and a discharge port formed in an outer circumferential surface of the clean female coupler body, the injection port is configured to supply the cleaning fluid or the drying fluid to the inner space of the clean female coupler body, and the discharge port is configured to drain the cleaning fluid or the drying fluid from the inner space of the clean female coupler body, and further comprising a contaminant draining means for cleaning and drying the wetted surfaces of the male coupler and the clean female coupler by draining the fluid introduced through the injection port to the discharge port.

3. The coupler according to claim 2, wherein the injection port and the discharge port are formed to be spaced apart from each other in the insertion direction of the male coupler and the clean female coupler.

4. The coupler according to claim 1, wherein the clean female coupler body is made of a resin material and the reinforcing plate is made of a metal material.

5. The coupler according to claim 1, wherein the clean female coupler body further comprises a third O-ring spaced apart from the second O-ring in the insertion direction of the male coupler and the clean female coupler to doubly prevent the leak of the chemicals.

6. A clean connection device including a clean female coupler and a male coupler to load and unload chemicals from one tank to another tank, comprising:

the male coupler including a male check plunger for opening and closing a flow path in the male coupler while sliding in a male coupler body;

the clean female coupler including a female check plunger for opening and closing a flow path in the clean female coupler while sliding in a clean female coupler body;

a coupler cleaning module for cleaning and drying wetted surfaces of the male coupler and the clean female coupler; and wherein the clean female coupler body has a first O-ring disposed on the clean female coupler body to prevent a residual chemical liquid, which is generated while the male coupler and the clean female coupler are separated from each other in a state in which the male coupler is inserted into the clean female coupler body, from leaking to outside, an alignment module for moving the male coupler in an X-axis direction to align with the clean female coupler, wherein the alignment module comprises:

a base plate;

a pinion rotatably connected to the base plate;

a pinion driving part rotating the pinion;

a pair of clamp guide rails extending in parallel in the X-axis direction in a state in which the pinion is interposed between the clamp guide rails;

a clamp slider guided by the clamp guide rails, the clamp slider having a rack coupled to the pinion; and an alignment clamp coupled to the clamp slider to align the male coupler by moving in the X-axis direction.

7. The clean connection device according to claim 6, further comprising:

a main body having the clean female coupler; and a coupler connection module for moving the male coupler connected to the one tank in a Y-axis direction so as to connect or disconnect the male coupler to or from the clean female coupler.

8. The clean connection device according to claim 7, wherein the coupler connection module comprises a grip part for gripping and fixing a flange of the male coupler, and a driving part for moving the grip part in the Y-axis direction, and wherein the grip part comprises:

a grip case having a hole through which the flange of the male coupler passes; at least a pair of grippers assembled to the grip case to bite the flange of the male coupler;

a pair of X-axis moving blocks to which the grippers are fixed and which face each other in the X-axis direction;

a pair of guide grooves each diagonally formed on an upper end of each of the pair of X-axis moving blocks;

a lifting block inserted into the pair of guide grooves to be vertically guided;

a lifting cylinder having a lifting rod coupled to the lifting block; and a guide housing for guiding each of the pair of X-axis moving blocks in the X-axis direction in a state in which the upper end of each of the pair of X-axis moving blocks is inserted into the guide housing.

9. The clean connection device according to claim 8, wherein the driving part comprises:

a Y-axis moving block to which the guide housing is coupled;

a grip part guide rail for guiding the Y-axis moving block to slide in the Y-axis direction;

a frame to which the grip part guide rail is coupled; and a driving means for moving the Y-axis moving block to a coupling-docking position.

\* \* \* \* \*